US008526885B2

(12) United States Patent
Lin et al.

(10) Patent No.: US 8,526,885 B2
(45) Date of Patent: Sep. 3, 2013

(54) PEER-TO-PEER HOST STATION

(75) Inventors: Gloria Lin, San Ramon, CA (US); Amir Mahmood Mikhak, Cambridge, MA (US); Taido Lantz Nakajima, Cupertino, CA (US); Sean Anthony Mayo, Dover, NH (US); Michael Rosenblatt, Campbell, CA (US)

(73) Assignee: Apple Inc, Cupertino, CA (US)

( * ) Notice: Subject to any disclaimer, the term of this patent is extended or adjusted under 35 U.S.C. 154(b) by 911 days.

(21) Appl. No.: 12/286,483

(22) Filed: Sep. 30, 2008

(65) Prior Publication Data

US 2010/0081385 A1   Apr. 1, 2010

(51) Int. Cl.
*H04B 7/00* (2006.01)

(52) U.S. Cl.
USPC ......... 455/41.3; 455/41.2; 455/443; 455/445; 455/452.1; 340/12.51; 340/12.54; 340/13.24; 340/291; 709/242

(58) Field of Classification Search
None
See application file for complete search history.

(56) References Cited

U.S. PATENT DOCUMENTS

| 7,260,646 | B1 * | 8/2007 | Stefanik et al. ............... 709/238 |
|---|---|---|---|
| 7,334,728 | B2 | 2/2008 | Williams |
| 7,376,591 | B2 | 5/2008 | Owens |
| 7,464,050 | B1 | 12/2008 | Deaton et al. |
| 2002/0082931 | A1 | 6/2002 | Siegel et al. |
| 2002/0178088 | A1 | 11/2002 | Lurie et al. |
| 2004/0203352 | A1 | 10/2004 | Hall et al. |
| 2005/0116027 | A1 | 6/2005 | Algiene et al. |
| 2005/0125343 | A1 | 6/2005 | Mendelovich |
| 2005/0131871 | A1 | 6/2005 | Howard et al. |
| 2006/0111944 | A1 | 5/2006 | Sirmans et al. |
| 2006/0243609 | A1 | 11/2006 | Cole et al. |
| 2007/0150369 | A1 | 6/2007 | Zivin |
| 2007/0155307 | A1 | 7/2007 | Ng et al. |
| 2007/0161402 | A1 | 7/2007 | Ng et al. |
| 2007/0278290 | A1 | 12/2007 | Messerges et al. |
| 2008/0005195 | A1 | 1/2008 | Li |

(Continued)

FOREIGN PATENT DOCUMENTS

| EP | 1331561 A2 | 7/2003 |
|---|---|---|
| WO | 02/008863 A2 | 1/2002 |
| WO | 2008/112497 A1 | 9/2008 |
| WO | 2009/018255 A2 | 2/2009 |

OTHER PUBLICATIONS

U.S. Appl. No. 61/034,890, filed Mar. 2008, Financail Transaction Using Near Field Communicati.*

(Continued)

*Primary Examiner* — Fayyaz Alam
*Assistant Examiner* — Mohammed Rachedine
(74) *Attorney, Agent, or Firm* — Park, Vaughan, Fleming & Dowler, LLP

(57) ABSTRACT

A method and system is disclosed for allowing the sharing of one or more system resources between multiple devices. In one embodiment, a requesting device transmits a resource access request to a target device using a near-field communication (NFC) protocol. The target device responds by using the NFC connection to return a listing of resources available for sharing to the requesting device. The requesting device may select one or more of the available resources and establish an appropriate connection to access the selected resource or resources. In one embodiment, the requesting device may lack external network connectivity capabilities while the target device includes wi-fi connectivity as a shared resource. Accordingly, the requesting device may access external network of the target device via the target as a conduit.

19 Claims, 22 Drawing Sheets

(56) References Cited

U.S. PATENT DOCUMENTS

| | | |
|---|---|---|
| 2008/0005290 A1* | 1/2008 | Nykanen et al. ............. 709/222 |
| 2008/0052243 A1 | 2/2008 | Narayanaswami et al. |
| 2008/0059323 A1 | 3/2008 | Cheng et al. |
| 2008/0154734 A1 | 6/2008 | Fernandez et al. |
| 2009/0191811 A1* | 7/2009 | Griffin et al. ............... 455/41.1 |

OTHER PUBLICATIONS

NFC Forum; Near Field Communication and the NFC Forum: The Keys to Truly Interoperable Communications; http://www.nfc-forum.org/resources/white_papers/nfc_forum_marketing_white_paper.pdf; Wakefield, MA, USA 2007.

Near Field Communication in the real world part I; Turning the NFC promise into profitable, everyday applications; http://www.nfc-forum.org/resources/white_papers/Innovision_whitePaper1.pdf ; Innovation Research & Technology plc; Gloucestershire, United Kingdom.

Near Field Communication in the real world part II, Using the right NFC tag type for the right NFC application; http://www.nfc-forum.org/resources/white_papers/Innovision_whitePaper2.pdf ; Innovation Research & Technology plc; Gloucestershire, United Kingdom.

Near Field Communication in the real world part III, Moving to System on Chip (SoC) integration; http://www.nfc-forum.org/resources/white_papers/Innovision_whitePaper3.pdf ; Innovation Research & Technology plc; Gloucestershire, United Kingdom 2007.

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

* cited by examiner

PEER-TO-PEER HOST STATION

The present disclosure relates generally to peer-to-peer transactions and, more particularly, to various systems, methods, and electronic devices configured to initiate and process such transactions.

DESCRIPTION OF THE RELATED ART

This section is intended to introduce the reader to various aspects of art that may be related to various aspects that are described and/or claimed below. This discussion is believed to be helpful in providing the reader with background information to facilitate a better understanding of these various aspects. Accordingly, it should be understood that these statements are to be read in this light, and not as admissions of prior art.

Modern electronic devices continue to evolve for use as storage and communication devices. Some of these electronic devices may include cellular telephones, portable media players, laptop computers, and personal data assistants, or combinational devices that combine one or more of the aforementioned devices into a single electronic device. At the same time as these devices are becoming more robust, they are also becoming increasingly compact and portable. Thus, despite the reduction in size, modern electronic devices continue to be able to offer functionality previously only available in larger non-portable devices or standalone devices. This functionality may include the ability to place and receive telephone calls, transmit and receive text messages, connect with the Internet, send emails, download and play media files, etc. all in one device.

Users of these electronic devices frequently store many types of data on any given electronic device. For example, a user may store contact information, calendar appointments, pictures, music, and/or links to web pages on electronic devices. Users may obtain these various types of data over the Internet or through connections to other electronic devices. Consequently, transfers of data between users and from the Internet have become increasingly important for users of electronic devices. Furthermore, increasing the speed with which these transfers may be executed has also become increasingly important for users of electronic devices. Additionally, certain devices may lack resources available to other devices, such as the ability for a device to place a phone call or access the Internet. There exists a need for sharing of resources from devices with access to specified resources and devices without access to those same resources.

SUMMARY

Certain aspects of embodiments disclosed herein by way of example are summarized below. It should be understood that these aspects are presented merely to provide the reader with a brief summary of certain embodiments and that these aspects are not intended to limit the scope of the claims. Indeed, the disclosure and claims may encompass a variety of aspects that may not be set forth below.

Performance of peer-to-peer communication between two or more devices is described below. This communication may be accomplished wirelessly. In one embodiment, a first and a second device communicate across a near field communication (NFC) link to determine if a common network exists between the devices. If such a common network does exist, the devices may undertake to create a communication path between the devices across the common network. Alternatively, if no common network is available, then one of the devices may act as a host for the second device and provide a network connection to the second device. The lack of a common network may be due to, for example, a connection being unavailable to the second device and/or the second device lacking the ability to connect to a network (e.g. no network interface hardware present in the second device). By the first device acting as a host for the second device, tunneling may occur. Tunneling may include the first device creating a network connection from the network of the first device for use by the second device. Furthermore, the first device may authorize the second device to share data files via a file sharing operation. In this manner, the tunneling may allow for direct file transfers between the devices, even when a common network is unavailable.

BRIEF DESCRIPTION OF THE DRAWINGS

Certain embodiments may be understood reading the following detailed description and upon reference to the drawings in which like characters represent like parts throughout the drawings, wherein.

DETAILED DESCRIPTION OF SPECIFIC EMBODIMENTS

One or more specific embodiments will be described below. In an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to wireless communications between two or more devices. Specifically, the devices may use a near field communication (NFC) connection to determine if communication between the devices is to be performed over a network or directly between the devices. If a common network is determined to exist between the devices, then the devices may communicate and/or transfer files over the common network. If, however, no common communication network is found to exist between the devices, one device may operate as a base station, or host, for the second device and may allow tunneling of a network connection from the first device to the second device. Furthermore, when a NFC connection is established between the first and second devices, a file sharing operation may occur that utilizes either a common network or the tunneled connection. In this manner, the tunneling may allow for direct file transfers between the devices, even when a common network is unavailable.

Figure 1:
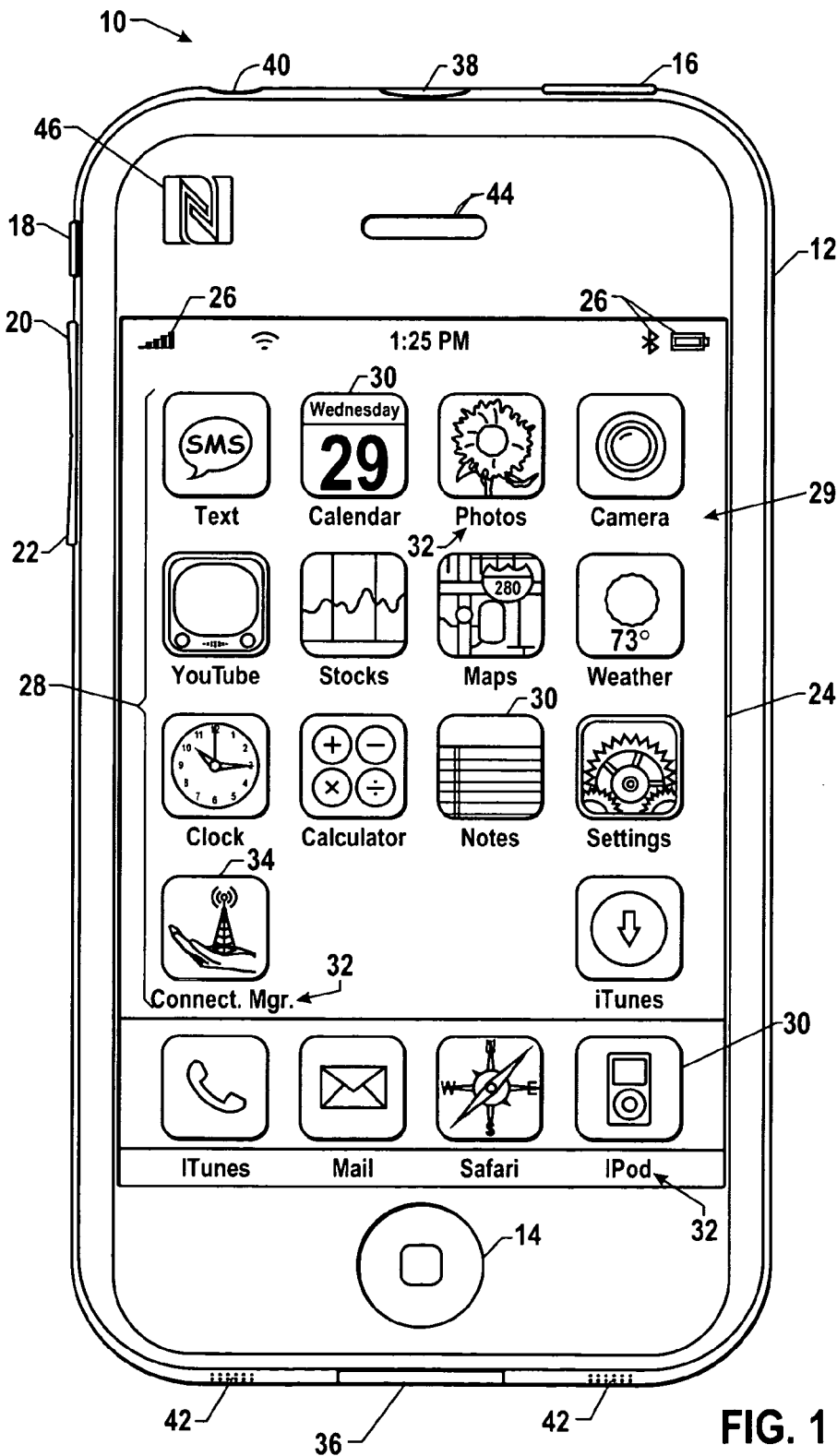
FIG. 1 is a front view of an electronic device, such as a portable media player, in accordance with one embodiment.

Turning now to the drawings and referring initially to FIG. 1, an electronic device that may include one or more transaction applications for providing the transaction related techniques and capabilities briefly mentioned above is illustrated and generally referred to by reference numeral 10. In accordance with the illustrated embodiment, the electronic device 10 may be a handheld device incorporating the functionality of one or more portable devices, such as a media player, a cellular phone, a personal data organizer, and so forth. Thus, depending on the functionalities provided by the electronic device 10, a user may listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connection protocols, such as Bluetooth and near field communication (NFC). By way of example only, the electronic device 10 may be a model of an iPhone®, available from Apple Inc. of Cupertino, Calif.

As shown in the illustrated embodiment, the device 10 may be enclosed by an enclosure or housing 12. The enclosure 12 may serve to protect the internal components of the device 10 from physical damage. In addition, the enclosure 12 may also provide the device 10 and its internal components shielding from electromagnetic interference. As will be appreciated by those skilled in the art, the enclosure 12 may be formed and/or constructed from any suitable material such as plastic, metal, or a composite material and may allow certain frequencies of electromagnetic radiation to pass through to wireless communication circuitry within the device 10 for facilitation of wireless communications.

The enclosure 12 may further provide for access to various user input structures, depicted in FIG. 1 by reference numerals 14, 16, 18, 20, and 22. By way of these user input structures, a user may interface with the device 10, wherein each user input structure 14, 16, 18, 20, and 22 may be configured to control one or more device functions when pressed or actuated. By way of example, the input structure 14 may include a button that when pressed or actuated causes a home screen or menu to be displayed on the device. The input structure 16 may include a button for toggling the device 10 between one or more modes of operation, such as a sleep mode, a wake mode, or a powered on/off mode, for example. The input structure 18 may include a dual-position sliding structure that may mute or silence a ringer in embodiments where the device 10 includes a cell phone application. Further, the input structures 20 and 22 may include buttons for increasing and decreasing the volume output of the device 10. It should be understood that the illustrated input structures 14, 16, 18, 20, and 22 are merely exemplary, and that the electronic device 10 may include any number of user input structures existing in various forms including buttons, switches, control pads, keys, knobs, scroll wheels, and so forth, depending on specific implementation requirements.

The electronic device 10 may further include a display 24 configured to display various images generated by the device 10. By way of example, the display 24 may be configured to display photos, movies, album art, and/or data, such as text documents, spreadsheets, text messages, and e-mail, among other things. The display 24 may also display various system indicators 26 that provide feedback to a user, such as power status, signal strength, call status, external device connections, or the like. The display 24 may be any type of display such as a liquid crystal display (LCD), a light emitting diode (LED) display, an organic light emitting diode (OLED) display, or other suitable display. In certain embodiments, the device 10 may include a touch sensitive element, such as a touch screen interface (not shown in FIG. 1) disposed adjacent to the display 24 that may function as an additional user input structure (e.g., in addition to structures 14, 16, 18, 20, and 22). By way of this touch screen interface, a user may select elements displayed on the display 24 such as, for example, by touching certain elements using the user's finger or a stylus.

As further shown in the present embodiment, the display 24 may be configured to display a graphical user interface ("GUI") 28 that allows a user to interact with the device 10. The GUI 28 may include various graphical layers, windows, screens, templates, elements, or other components that may be displayed on all or a portion of the display 24. For instance, the GUI 28 may display a plurality of graphical elements, depicted here generally as icons 30. By default, such as when the device 10 is first powered on, the GUI 28 may be configured to display the illustrated icons 30 as a "home screen," represented herein by the reference numeral 29. In certain embodiments, the user input structures 14, 16, 18, 20, and 22, may be used to navigate through the GUI 28 and, accordingly, away from the home screen 29. For example, one or more of the user input structures may include a wheel structure that may allow a user to select various icons 30 displayed by the GUI 28. Additionally, the icons 30 may also be selected via the touch screen interface.

As will be appreciated, the icons 30 may represent various layers, windows, screens, templates, elements, or other components that may be displayed in some or all of the areas of the display 24 upon selection by the user. Furthermore, the selection of an icon 30 may lead to or initiate a hierarchical screen navigation process. For instance, the selection of an icon 30 may cause the display 24 to display another screen that includes one or more additional icons 30 or other GUI elements. Also, as shown in the present embodiment, each graphical element 30 may have one or more textual indicators 32 associated therewith, which may be displayed on or near its respective graphical element 30 to facilitate user interpretation of each graphical element 30. For example, the icon 34 may be associated with the textual indicator "Connect Mgr." Furthermore, it should be appreciated that the GUI 28 may include various components arranged in hierarchical and/or non-hierarchical structures.

When an icon 30 is selected, the device 10 may be configured to initiate, open, or run an application associated with the selected icon 30 and to display a corresponding screen. For example, when the Connect Mgr icon 34 is selected, the device 10 may open a connection manager program and display a menu showing various available connections for the device, such as an Internet connection, a mobile network connection, or an intranet/local access network connection. Thus, for each application provided on the device 10, one or more respective screen or screens may be displayed on the display 24 that may include various user interface elements corresponding to a respective application.

The electronic device 10 may also include various input/output (I/O) ports, such as the illustrated I/O ports 36, 38, and 40. These I/O ports may allow a user to connect the device 10 to or interface the device 10 with one or more external devices. For example, the input/output port 36 may include a proprietary connection port for transmitting and receiving data files, such as media files. The input/output port 38 may include a connection slot for receiving a subscriber identify module (SIM) card, for instance, where the device 10 includes cell phone functionality. The input/output port 40 may be an audio jack that provides for connection of audio headphones or speakers. As will appreciated, the device 10 may include any number of input/output ports configured to connect to a variety of external devices, such as to a power source, a printer, and a computer, or an external storage device, just to name a few. As will appreciated, the I/O ports may include any suitable interface type such as a universal serial bus (USB) port, serial connection port, FireWire port (IEEE-1394), or AC/DC power connection port.

Further, in some embodiments, certain I/O ports may be configured to provide for more than one function. For instance, in one embodiment, the I/O port 36 may be configured to not only transmit and receive data files, as described above, but may be further configured to couple the device to a power charging interface, such as an power adaptor designed to provide power from a electrical wall outlet, or an interface cable configured to draw power from another electrical device, such as a desktop computer. Thus, the I/O port 36 may be configured to function dually as both a data transfer port and an AC/DC power connection port depending, for example, on the external component being coupled to the device 10 through the I/O port 36.

The electronic device 10 may also include various audio input and output elements. For example, the audio input/output elements, depicted generally by reference numeral 42, may include an input receiver, which may be provided one or more microphones. For instance, where the electronic device 10 includes cell phone functionality, the input receivers may be configured to receive user audio input such as a user's voice. Additionally, the audio input/output elements 42 may include one or more output transmitters. Thus, where the device 10 includes a media player application, the output transmitters of the audio input/output elements 42 may include one or more speakers for transmitting audio signals to a user, such as playing back music files, for example.

Further, where the electronic device 10 includes a cell phone application, an additional audio output transmitter 44 may be provided, as shown in FIG. 1. Like the output transmitter of the audio input/output elements 42, the output transmitter 44 may also include one or more speakers configured to transmit audio signals to a user, such as voice data received during a telephone call. Thus, the input receivers and the output transmitters of the audio input/output elements 42 and the output transmitter 44 may operate in conjunction to function as the audio receiving and transmitting elements of a telephone.

In the illustrated embodiment, the electronic device 10 further includes a near field communication (NFC) device 46. The NFC device 46 may be located within the enclosure 12, and a mark or symbol on the exterior of the enclosure 12 may identify its location within the enclosure 12. The NFC device 46 may include an antenna that may generally be positioned along the circumference of the housing 12, and may allow for close range communication at relatively low data rates (e.g., 424 kb/s), and may comply with standards such as ISO 18092 or ISO 21481. In some embodiments, the NFC device 46 may also allow for close range communication at relatively high data rates (e.g., 560 Mbps), and may comply with the TransferJet® protocol. As used herein, it should be understood that the term "NFC device" refers to both an NFC communication device 46, as well as the above-mentioned antenna.

In certain embodiments, the communication using the NFC device 46 may occur within a range of approximately 2 to 4 cm. As will be appreciated by those skilled in the art, close range communication using the NFC device 46 may take place via magnetic field induction, thus allowing the NFC device 46 to communicate with other NFC-enabled devices or to retrieve information from tags having radio frequency identification (RFID) circuitry. Additionally, magnetic field induction may also allow the NFC device 46 to "wake" or induce another NFC-enabled device that is in a passive or sleep mode into an active mode. As will discussed in further detail below, the NFC device 46 may be utilized in conjunction with the transaction application described above (e.g., represented by graphical element 34) to provide for the acquisition and transmission of payment and crediting information, as well as communication with one or more external servers for processing and authorization of a transaction as well as the verification of payment and crediting accounts.

Figure 2:
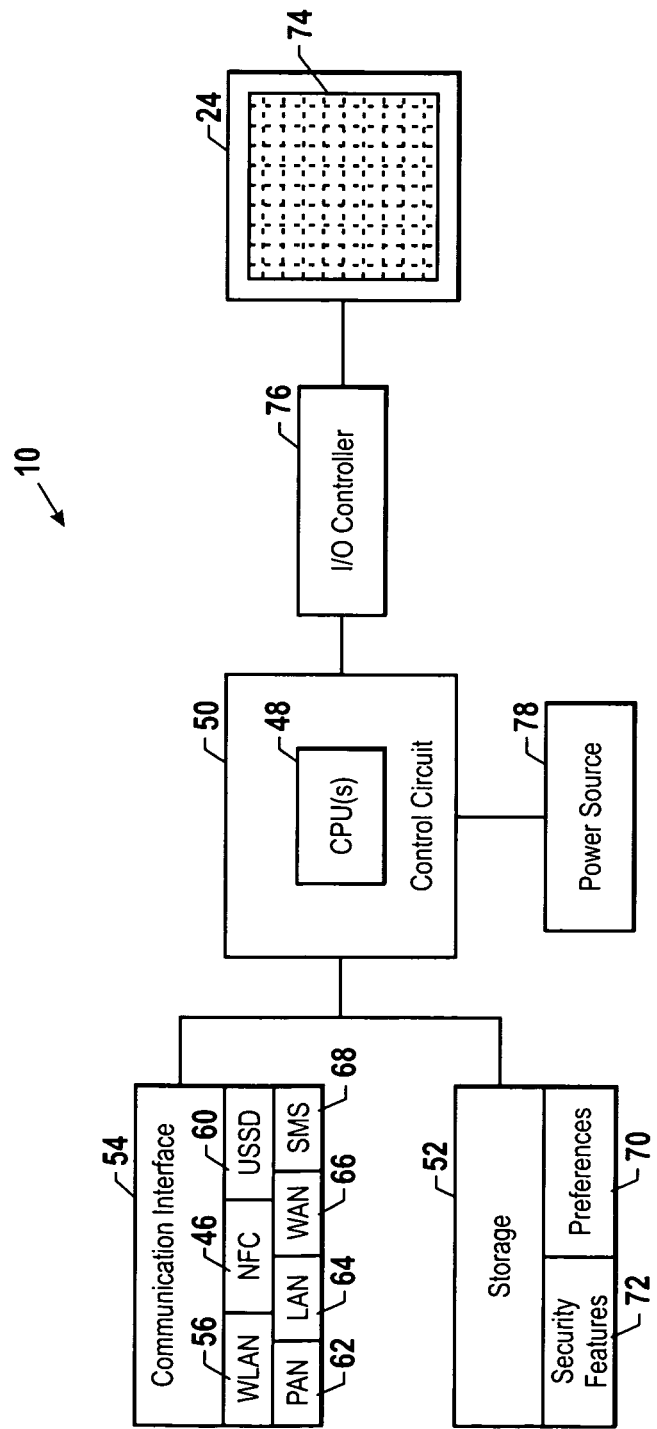
FIG. 2 is a block diagram of certain components of the electronic device of FIG. 1.

Additional details of the illustrative device 10 may be better understood through reference to FIG. 2, which is a block diagram illustrating various components and features of the device 10 in accordance with one embodiment of the present invention. The block diagram includes the display 24 and the NFC device 46 discussed above, as well as many other components.

The operation of the device 10 may be controlled by a central processing unit (CPU) 48 and a control circuit 50 that provide the processing capability required to execute the operating system, programs, GUI 28, and any other functions of the device 10. The CPU 48 may include a single processor or it may include a plurality of processors. For example, the CPU 48 may include "general purpose" microprocessors, a combination of general and special purpose microprocessors, instruction set processors, graphics processors, video processors, and/or related chips sets, and/or special purpose microprocessors. The control circuit 50 may include one or more data buses for transferring data and instructions between components of the device 10. The control circuit 50 also may include on board memory for caching purposes.

Information used by the CPU 48 may be located within long-term storage 52. The long-term storage 52 of electronic device 10 may be used for storing data required for the operation of the CPU 48 as well as other data required by the device 10. For example, the storage 52 may store the firmware for the electronic device 10 that is used by the CPU 48. The firmware may include an operating system, as well as other programs that enable various functions of the electronic device 10, GUI functions, and/or processor functions.

The storage 52 also may store components for the GUI 28, such as graphical elements, screens, and templates. Additionally, the long term storage 52 may store data files such as media (e.g., music and video files), image data, software, preference information (e.g., media playback preferences), wireless connection information (e.g., information that may enable the device 10 to establish a wireless connection, such as a telephone connection), subscription information (e.g., information that maintains a record of podcasts, television shows or other media to which a user subscribes), telephone information (e.g., telephone numbers), and any other suitable data. The long term storage 52 may be non-volatile memory such as read only memory, flash memory, a hard drive, or any other suitable optical, magnetic, or solid-state computer readable media, as well as a combination thereof.

One or more communication interfaces 54 may provide additional connectivity channels for receiving and transmitting information. The communication interface 54 may represent, for example, one or more network interface cards (NIC) or a network controller as well as associated communication protocols. The communication interface 54 may include several types of interfaces, including but not limited to, a wireless local area network (WLAN) interface 56, an unstructured supplementary service data (USSD) interface 60, a personal area network (PAN) interface 62, a local area network (LAN) interface 64, a wide area network (WAN) interface 66, a short message service (SMS) interface 68, and the NFC device 46.

The PAN interface 62 may provide capabilities to network with, for example, a Bluetooth® network, an IEEE 802.15.4 (e.g., ZigBee) network, or an ultra wideband network (UWB). As should be appreciated, the networks accessed by the PAN interface 62 may, but do not necessarily, represent low power, low bandwidth, or close range wireless connections. The PAN interface 62 may permit one electronic device 10 to connect to another local electronic device, such as a computer or portable media player, via an ad-hoc or peer-to-peer connection. However, the connection may be disrupted if the separation between the two electronic devices exceeds the range of the PAN interface 62.

The LAN interface 64 and WLAN interface 56 may provide longer-range communication channels, generally exceeding the range available via the PAN interface 62. The LAN interface 64 may represent an interface to a wired Ethernet-based network, and the WLAN interface 56 may represent an interface to a wireless LAN, such as an IEEE 802.11x wireless network. Additionally, in many cases, a connection between two electronic devices via the LAN interface 64 may involve communication through a network router or other intermediary device.

Connection to a wide area network (WAN) may be provided through the WAN interface 66. In certain embodiments, the wide area network may include a private network maintained by a merchant for transferring information between retail stores. The WAN interface 66 may permit a connection to a cellular data network, such as the Enhanced Data rates for GSM Evolution (EDGE) network or the 3G network. When connected via the WAN interface 66, the electronic device 10 may remain connected to the Internet and, in some embodiments, to another electronic device, despite changes in location that might otherwise disrupt connectivity via the PAN interface 62 or the LAN interface 64.

In certain embodiments, the device 10 may use a device identification networking protocol to establish a connection with an external device through a network interface. For example, both the device 10 and the external device may broadcast identification information using internet protocol (IP). The devices may then use the identification information to establish a network connection, such as a PAN connection or a LAN connection, between the devices. By way of example, the device identification protocol may be Bonjour® by Apple Inc.

Small size communications may be sent using the USSD interface 60 and the SMS interface 68. The SMS interface 68 may allow transmission of text messages of 140 bytes or less. In certain embodiments, larger size messages may be sent using concatenated SMS. The USSD interface 60 may facilitate the transmission of real-time text messages over GSM signaling channels. For example, the USSD interface 60 may be used to query inventory or price information for an article of merchandise.

Close range communication may occur through the NFC device 46. The NFC device 46 may exist as a separate component, may be integrated into another chipset, or may be, for example, part of a system on a chip (SoC). The NFC device 46 may include one or more protocols, such as the Near Field Communication Interface and Protocols (NFCIP-1) for communicating with another NFC enabled device. The protocols may be used to adapt the communication speed and to designate one of the connected devices as the initiator device that controls the near field communication. In certain embodiments, the NFC device 46 may be used to receive information, such as the service set identifier (SSID), channel, and encryption key, used to connect through another communication interface 56, 62, 64, or 66.

The NFC device 46 may control the near field communication mode of the electronic device 10. For example, the NFC device 46 may be configured to switch between a reader/writer mode for reading NFC tags, a peer-to-peer mode for exchanging data with another NFC enabled device, and a card emulation mode for allowing another NFC enabled device to read information. The NFC device 46 also may be configured to switch between an active mode where the NFC device 46 generates its own RF field and a passive mode where the NFC device 46 uses load modulation to transfer data to another device generating a RF field. Operation in passive mode may prolong the battery life of the device 10. In certain embodiments, the modes of the NFC device 46 may be controlled based on user or manufacturer preferences 70.

The preferences 70 may be stored within the storage 52 and may be set by the device manufacturer or by a user through the GUI 28 (FIG. 1). The preferences 70 may determine properties of a communication interface 54, 56, 60, 62, 64, 66, 68, and/or 46. For example, the preferences 70 may include a list of networks that the device 10 may connect to. In another example, the preferences 70 may specify the mode of the NFC device 46. For example, the NFC device 46 may operate in a passive mode or an active mode, as specified by the preferences 70.

The preferences 70 also may govern the selection priority between the communication interfaces 54, 56, 60, 62, 64, 66, 68, and/or 46. For example, the device 10 may be configured to communicate through the LAN interface 64 whenever a LAN connection is available. In certain embodiments, the preferences 70 may be based on properties of the data to be transferred. For example, a user may specify that purchases involving a large number of articles be communicated only through the WLAN interface 56 or the WAN interface 66. The preferences 70 may be based on a number of factors, including, but not limited to, the size of the data to be transferred, the type of data, and the security features 72 available for a given communication interface.

The security features 72 may include one or more cryptographic protocols, such as a secure sockets layer (SSL) protocol or a transport layer security (TLS) protocol, for establishing secure communications between the device 10 and another device. The security features 72 may be particularly useful when transmitting payment information, such as credit card information or bank account information. The security features 72 also may include a secure storage area that may have restricted access. For example, a password or other verification may need to be provided to access the secure storage area. In certain embodiments, some or all of the preferences 70 may be stored within the secure storage area. Further, security information, such as an authentication key, for communicating with a retail server may be stored within the secure storage area. In certain embodiments, the secure storage area may include a microcontroller embedded within the electronic device 10.

Information received through the communication interface 54, as well as information contained in the storage 52, may be displayed on the display 24. As noted above, a user may select information to display through the GUI 28 (FIG. 1). A touch screen 74 may be positioned in front of or behind the display 24 and may be used to select graphical elements, such as the icons 30 (FIG. 1), shown on the display 24. The touch screen 74 is configured to receive input from a user's or object's touch and to send the information to the CPU 48, which interprets the touch event and performs a corresponding action. The touch screen 74 may employ any suitable type of touch screen technology such as resistive, capacitive, infrared, surface acoustic wave, electromagnetic, or near field imaging. Furthermore, the touch screen 74 may employ single point or multipoint sensing.

An input/output (I/O) controller 76 may provide the infrastructure for exchanging data between the control circuit 50 and the input/output devices, such as the touch screen 74 and the display 24. The I/O controller 76 may contain one or more integrated circuits and may be integrated within the control circuit 50 or exist as a separate component. The I/O controller 76 also may provide the infrastructure for communicating with external devices through the I/O ports 36, 38, and 40 shown in FIG. 1, and may be used for connecting the device 10 to an external computer, bar code scanner, a printer, audio headphones, or the like.

The I/O controller 76 also may provide the infrastructure for communicating with the CPU 48 through the input structures 14, 16, 18, 20, and 22 shown in FIG. 1. The user input structures 14, 16, 18, 20, and 22 may be used in conjunction with, or independently of, the touch screen 74 to select inputs for the device 10.

The portability of the device 10 makes it particularly well suited for travel with a user. To facilitate transport and ease of motion, the device 10 may include an integrated power source 78 for powering the device 10. The power source 78 may include one or more batteries, such as a Li-Ion battery, which may be user-removable or secured to the enclosure 12. The power source 78 may also be rechargeable. In certain embodiments, the proprietary connection I/O port 36 may be used to connect the device 10 to a power source for recharging the power source 78. In this manner, the power source 78 may be able to receive power from an external AC or a DC power source, such as an electrical outlet or a car cigarette lighting mechanism.

Figure 3:
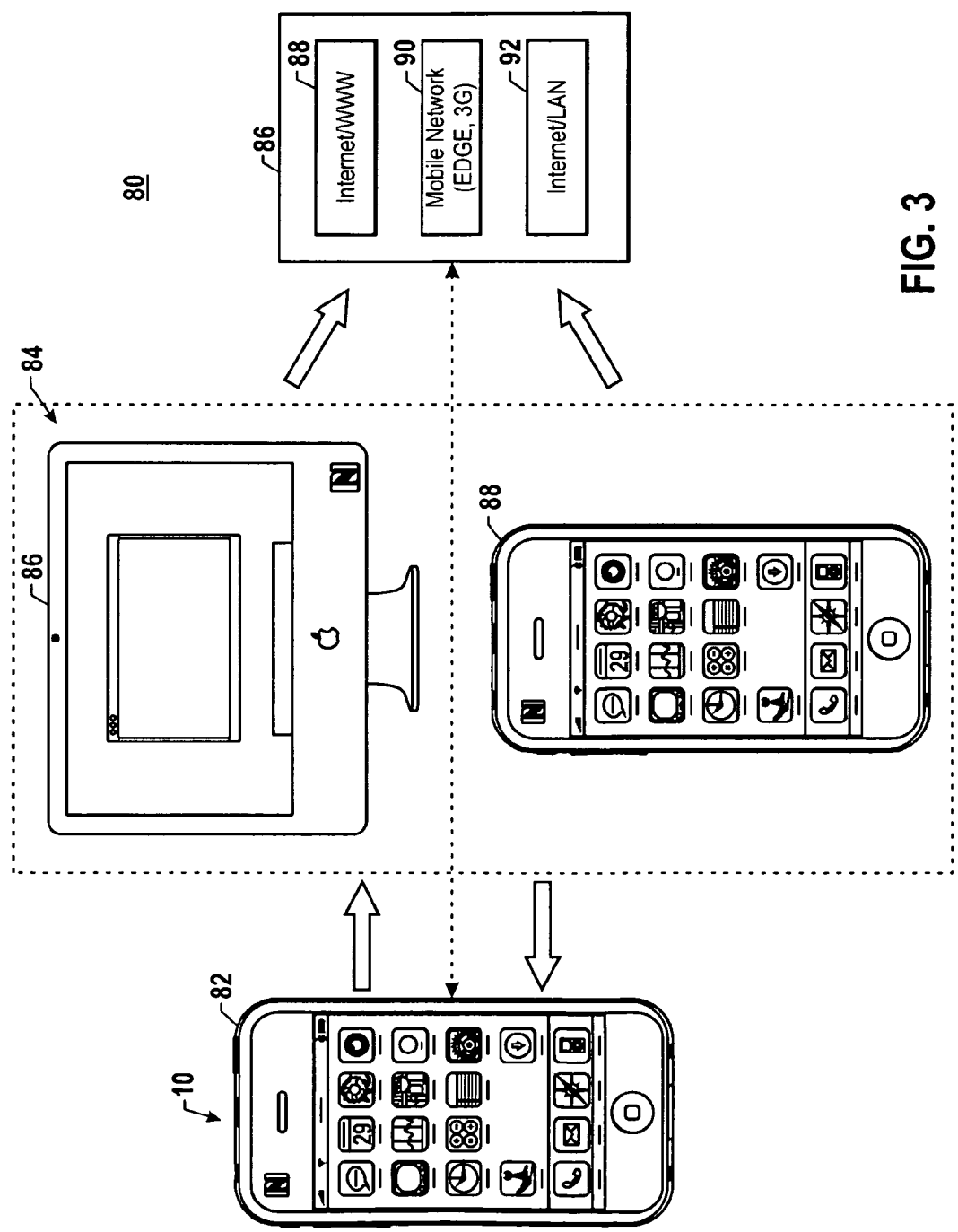
FIG. 3 is a diagram of a wireless network in which the electronic device of FIG. 1 may operate.

FIG. 3 illustrates the electronic device 10 as part of a communication system 80. The electronic device 10 may act as a host 82, while a secondary device may act as a client 84. The client 84 may, for example, be a computer 86 or a multimedia device 88. Additionally, the host 82 may be an electronic device 10, and the client may be a computer 86 that has lost an internet connection. By utilization of a connection the host 82 has to the Internet, for example, the computer 86 may be able to utilize the Internet connection of the host 82 via tunneling, that is, by the device 10 creating a network connection for a network used by the host 82 to be accessed by the client 84 (computer 86).

In another embodiment, the host 82 and the client 84 may each be able to connect one or more networks 86. The networks 86 may include an Internet connection 88 via a WLAN connection 56, a mobile network connection 90 via a WAN connection 66 utilizing an EDGE or a 3G network, and/or an intranet connection via a LAN connection 64. The host 82 and the client 84 may utilize one or more of the networks 86 to affect data transfers between themselves. To facilitate data transfers between the host 82 and the client 84, a common network, i.e. a network accessible by both the host 82 and the client 84, may be selected and utilized. Selection of a common network may make for faster data transfers due, in part, to a uniform data transfer protocol that may be present when both the host 82 and the client 84 operate on a common network. Furthermore, the networks 86 may each contain separate bandwidth allotments for data transfers. Accordingly, selection of a common network with a larger bandwidth allotment for data transfers may lead to faster data transfers between the host 82 and the client 84. Therefore, selection of a common network between the host 82 and the client 84 may be advantageous.

Figure 4A:
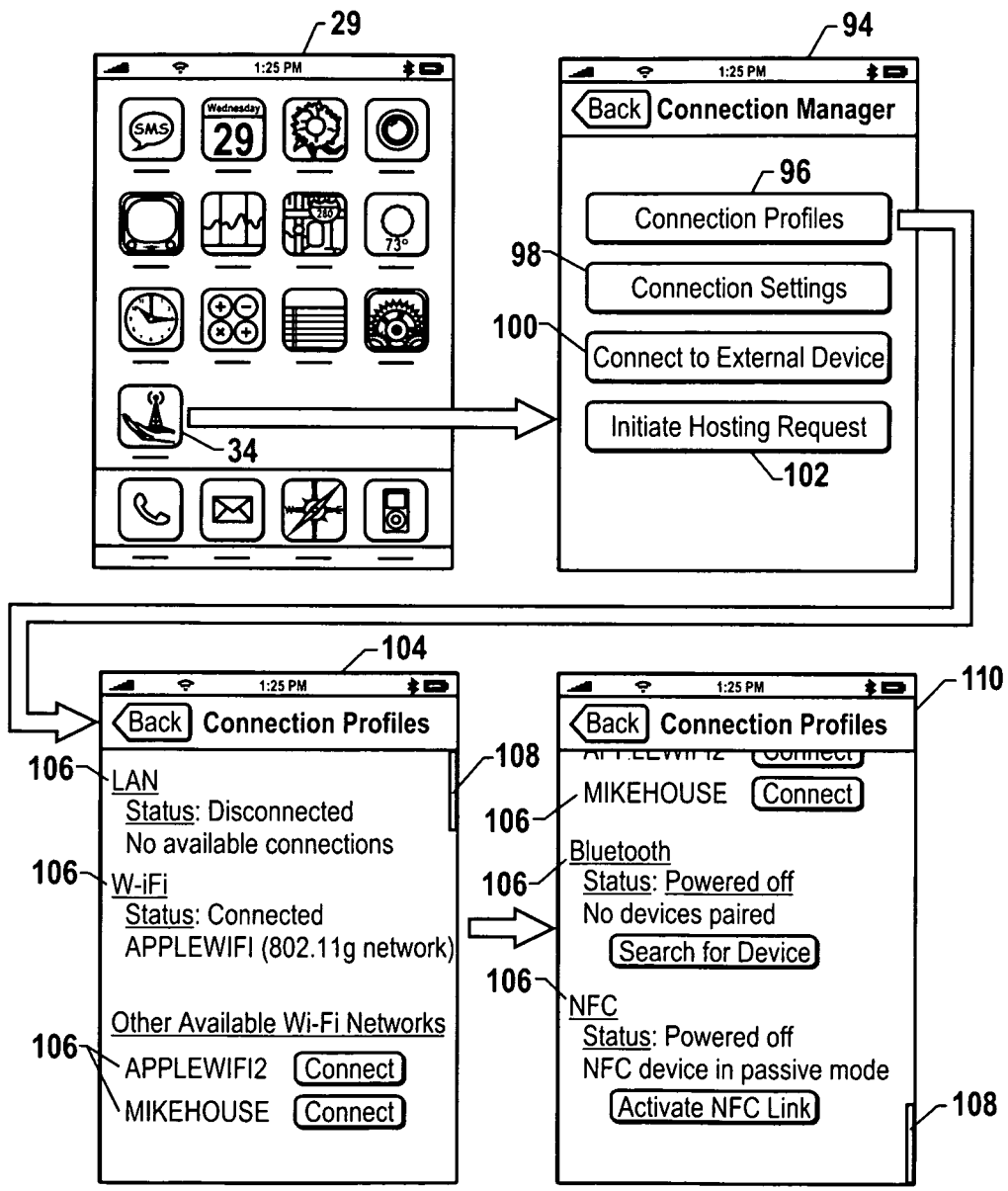
FIGS. 4A-4C are a series of screens displayed on the electronic device of FIG. 1 in conjunction with determining the networks available for data transfers.
Figure 4B:
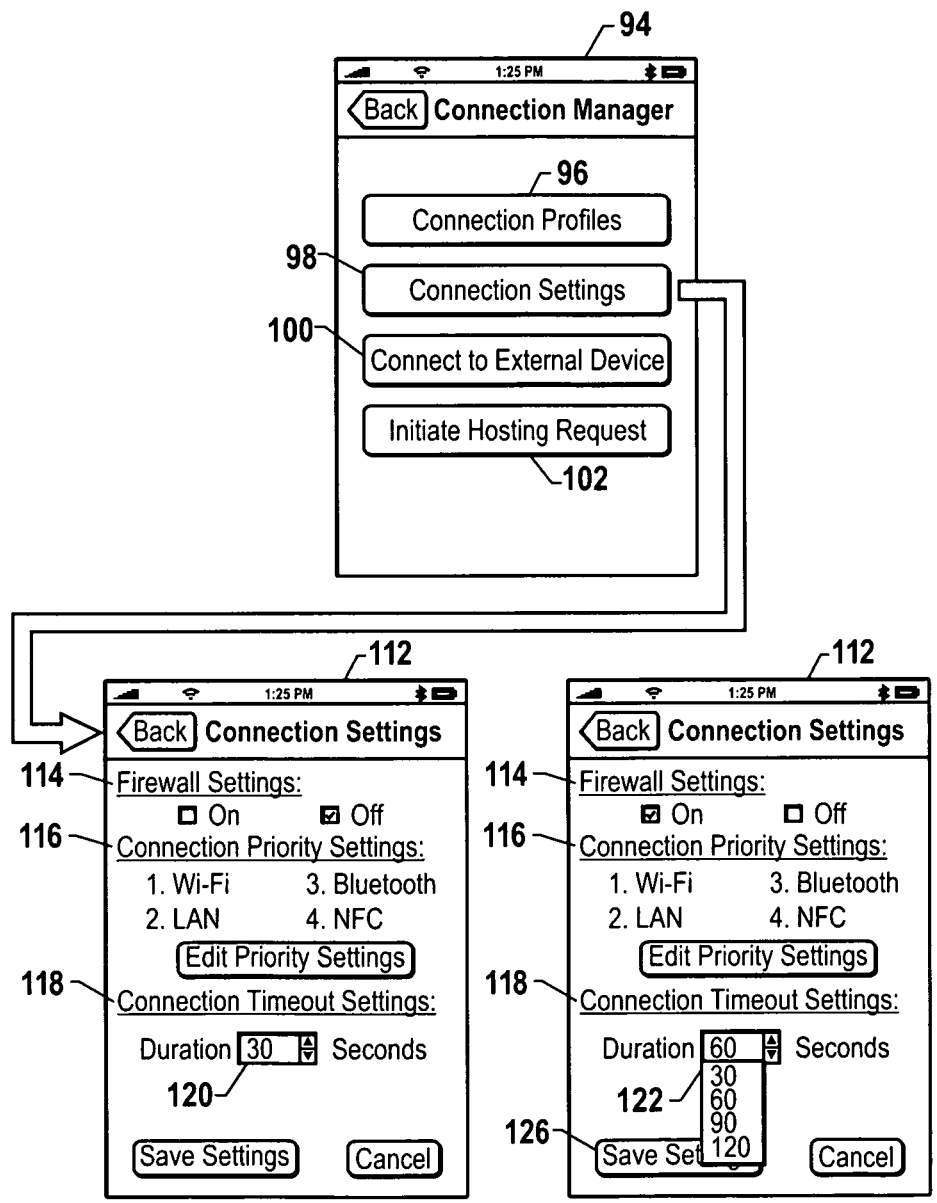
Figure 4C:
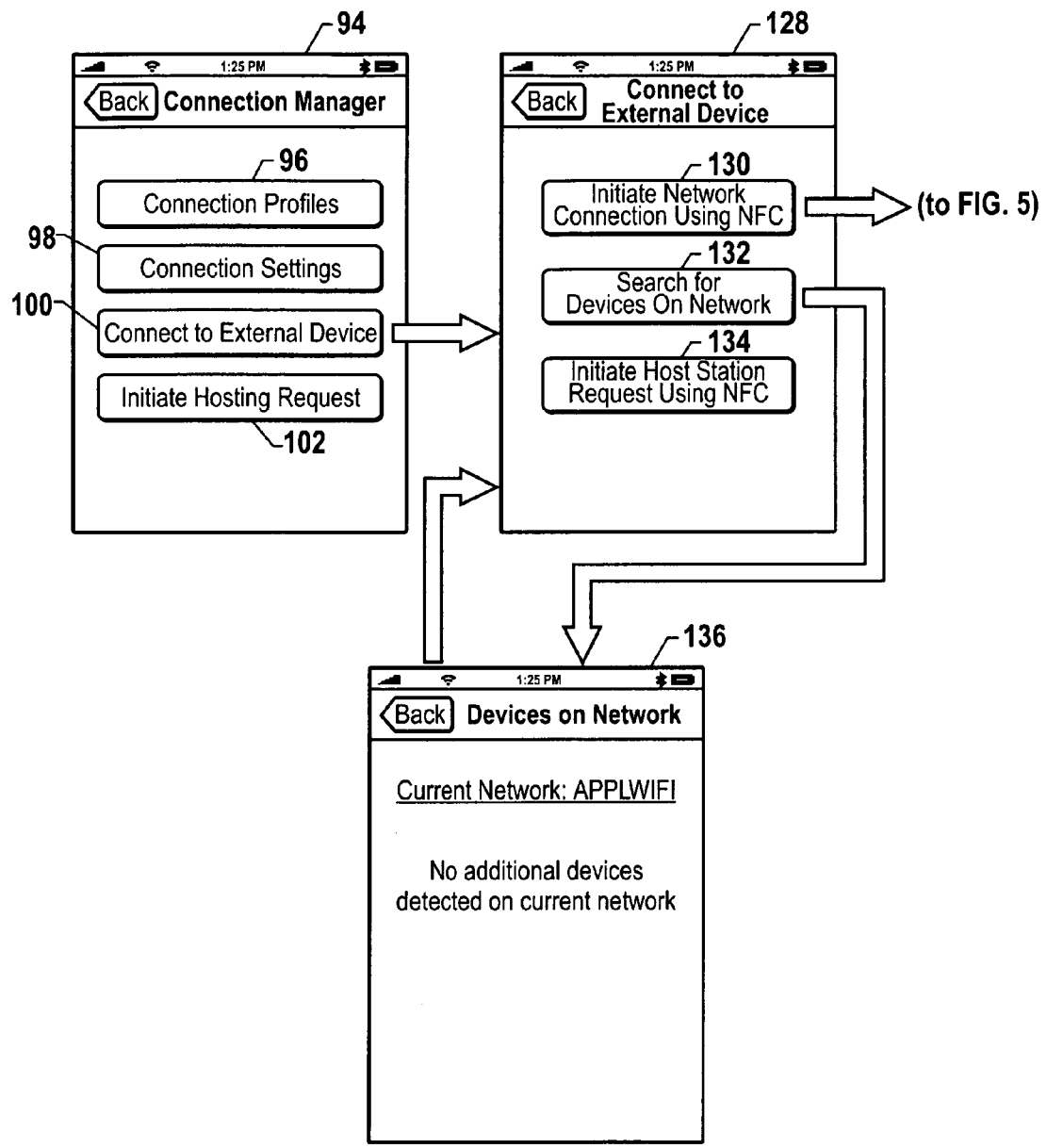

Examples of the screens displayed on the device 10 that a user may see in conjunction with determining a common network available for data transfers are illustrated in FIGS. 4A-C. FIG. 4A first shows the home screen 29 of the device 10. Upon selection of Connect Mgr. icon 34, the device 10 may open a connection manager program. The connection manager program may display a selection page 94. The selection page 94 may display a group of selection tabs, such as a connection profiles tab 96, a connection settings tab 98, a connect to external device tab 100, and an initiate hosting request tab 102. Selection of the connection profiles tab 96 may cause the connection manager program to display a connection profile page 104. This connection profile page 104 may display the status and/or availability of all potential network connections 106 available to the device 10. The connection profile page 104 may include more potential network connections 106 than can be viewed on the display 24 at a give time. Accordingly, a scroll bar 108 may be displayed on the display 24. User input may move the scroll bar, thus bringing additional potential network connections 106 into view on the display 24, as shown in screen 110.

FIG. 4B illustrates the selection page 94 in conjunction with selection of the connection settings tab 98. Selection of the connection settings tab 98 may cause the connection manager program to display a connection settings page 112. This connection settings page 112 may display the current network connection settings such as Firewall settings 114, connection privacy settings 116, and connection timeout settings 118. Editing of each of the current network connection settings 114-118 is possible through interaction with the device via touch and/or input structures 14, 16, 18, 20, and 22. For example, the connection timeout settings may be changed by touching the display 24 at a location corresponding to the duration clock 120. Touching the display 24 over the location of the duration clock 120 may bring up a menu 122 that provides additional timeout values, as illustrated in screen 124. Any of these values may be selected by a user via touch, and the new choice may be saved via touch over save tab 126.

FIG. 4C illustrates the selection page 94 in conjunction with selection of the connect to external device tab 100. Selection of the connect to external device tab 100 may cause the connection manager program to display a connect to external device page 128. This connect to external device page 128 may display an initiate network connection using NFC tab 130, a search for devices on the network tab 132, and an initiate host station request using NFC tab 134. Selection of the initiate network connection using NFC tab 130 may initiate a network connection procedure illustrated in FIG. 5. Alternatively, selection of the search for devices on the network tab 132 may initiate a search of the current network selected for additional devices utilizing the current network selected, as seen in screen 136.

Figure 5:
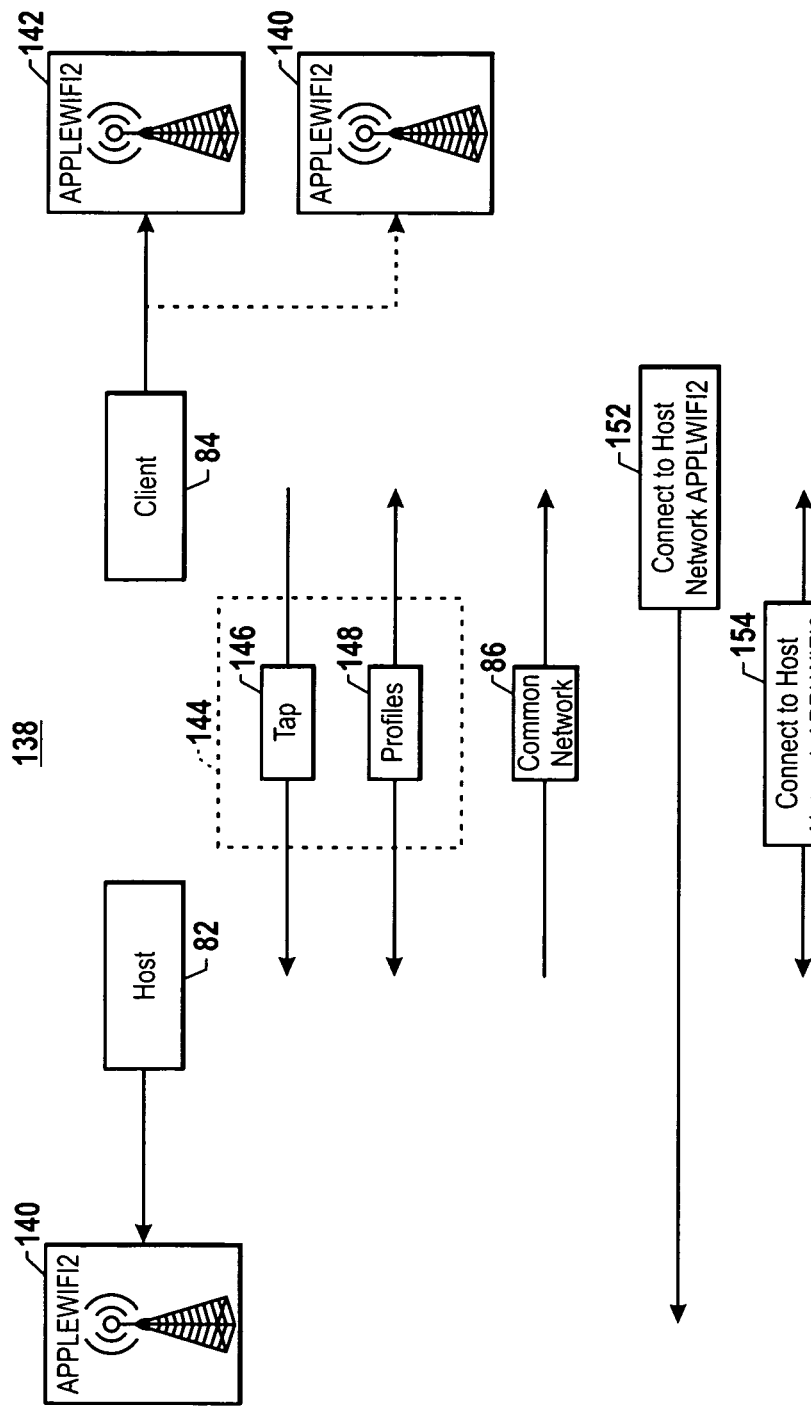
FIG. 5 illustrates a network connection procedure between an electronic device of FIG. 1 and a second device via a near field communication (NFC) connection.

In FIG. 5, a procedure 138 for initiation of a network connection between a host 82 and a client 84 using NFC is illustrated. The host 82 is shown as connected to a single wi-fi network 140. The client 84 shown as having being able to connect to two wi-fi networks, 140 and 142. The client 84, as illustrated, is connected to the wi-fi network 142. Upon initiating an NFC connection 144, by way of a tap operation 146, the profiles 148 of the host 82 and of the client 84 may be exchanged, which may include a list of networks the host 82 and client 84 may be able to connect to, respectively. If the profiles 148 overlap, a notification of a common network is transmitted. Subsequently, when one device, here the client 84, switches to the common network, a connection notice 152 is transmitted to the other device, here the host 82. Subsequently, the host 82 and the client 84 may communicate and/or exchange data 154 on the common network, which may be include any suitable network that may be provided by the communication interfaces 54-66. For instance, the common network may be a wireless internet connection established by way of the WLAN interface 56, a local area network connection established through the LAN interface 64, or a wide area network connection established by way of the WAN interface 66, which may include one of various WAN mobile communication protocols, such as a General Packet Radio Service (GPRS) connection, an EDGE connection (Enhanced Data rates for GSM Evolution connection), or a 3G connection, such as in accordance with the IMT-2000 standard. In the illustrated example in FIG. 5, APPLEWIFI12 is a common network.

As used herein, the term "tap" and "tap operation," or the like, shall be understood to mean the action of placing one NFC-enabled device within the proximity of one or more additional NFC-enabled devices such that an NFC-based connection may be established between the devices. As discussed above, one technique for establishing an NFC-based connection may be through magnetic field induction, whereby a first NFC-enabled device acting as a host device generates an RF field, which in turn induces an NFC device located within a second device to transition from a passive state to an active state, thus establishing an NFC connection. Once established, information may be exchanged between the devices by way of the NFC connection.

Figure 6A:
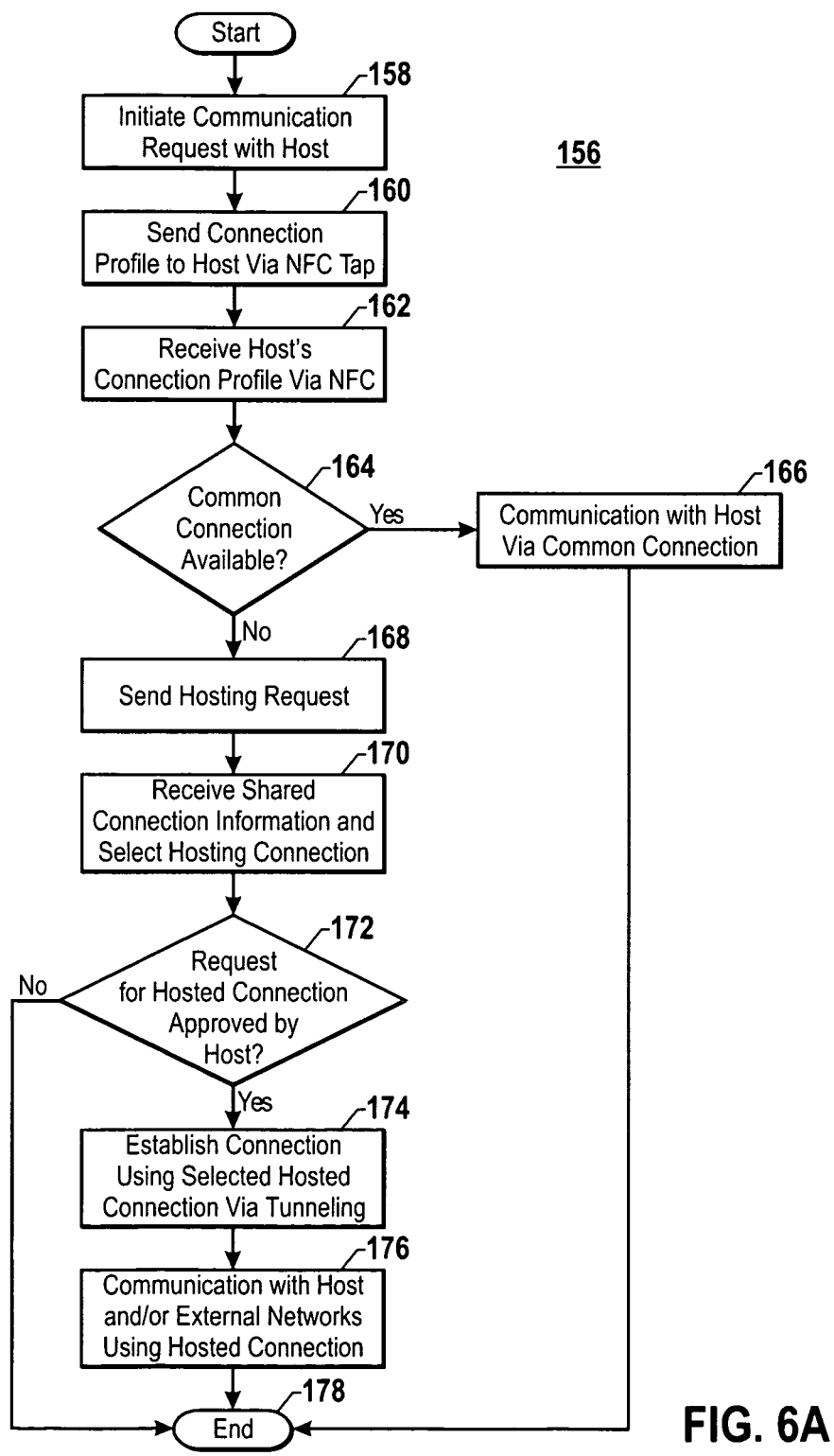
FIG. 6A is a flow chart corresponding to the procedure of FIG. 5 from the perspective of the second device of FIG. 5.

FIG. 6A illustrates a flow chart 156 corresponding to procedure 138 from the perspective of the client 84. The flow chart 156 begins at step 158, whereby the client 84 initiates a communication request with the host 82. Subsequently, the client 84 sends its connection profile to the host via a NFC tap operation 146 in step 160. The client 84 also receives the profile 148 of the host 82 in step 162.

A determination is made in step 164 as to the overlap of the profiles 148, that is, if a common network is available for connection. If a common network is available for connection, then a notification of a common network is transmitted and the host 82 and the client 84 may communicate and/or exchange data 154 on the common network, which may be include any suitable network that may be provided by the communication interfaces 54-66, in step 166. For example, if both devices have wi-fi connection capability, and both are authorized to connect to a particular private wi-fi connection, then the devices may connect to the common private wi-fi connection.

If, however, no overlap of the profiles 148 exists in step 164, then the client 84 may send a hosting request in step 168. In response to the hosting request, the client 84 may receive shared connection information from the host 82 and may select a hosting connection from the shared connection information transmitted from the host 82 in step 170. The selected hosting connection may then be transmitted to the host 82. If, in step 172, the selected hosting connection is approved by the host 82, a connection may be established using the selected hosting connection of the host 82 via in step 174 and client 84 may communicate through the hosted connection in step 176 to an external network or to the host 82. For example, the host 82 may provide a hosting connection to the client 84 over an IEEE 802.11 or other similar interface so that the client 84 may use resources of the host 82, such as a private wi-fi connection, a cellular network, etc., as well as exchange data files with the host 82. If, however, the selected hosting connection is not approved by the host 82 in step 172, the procedure 138 for communication between the host 82 and the client 84 ends at step 178.

Figure 6B:
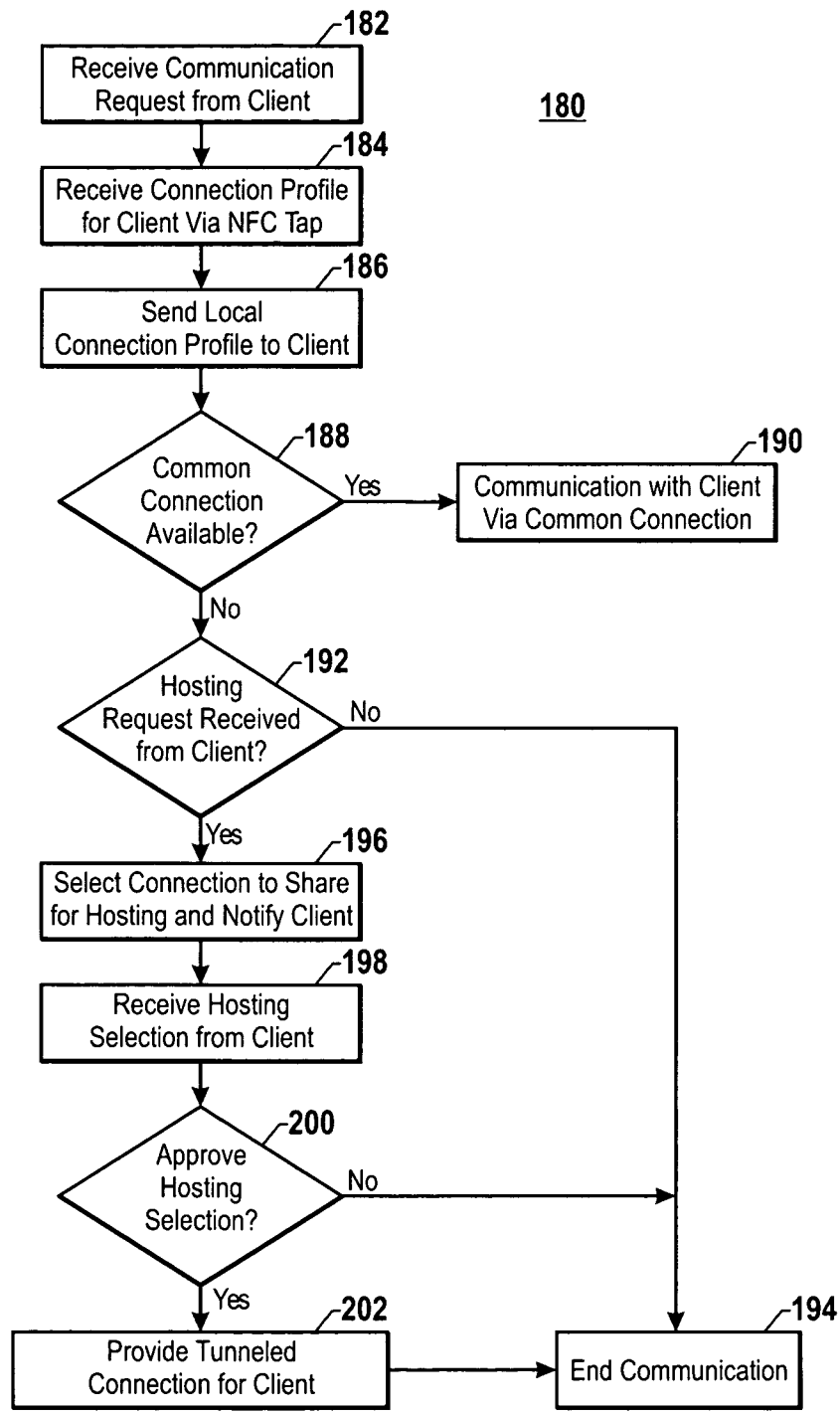
FIG. 6B is a flow chart corresponding to the procedure of FIG. 5 from the perspective of the electronic device of FIG. 1.

FIG. 6B illustrates a flow chart 180 corresponding to procedure 138 from the perspective of the host 82. The flow chart 180 begins at step 182, whereby the host 82 receives a communication request with the client 84. Subsequently, the host 82 receives the profile 148 of the client 84 in step 184 and the host 82 sends its connection profile to the client 84 via a NFC tap operation 146 in step 186.

A determination is made in step 188 as to the overlap of the profiles 148, that is, if a common network is available for connection. If a common network is available for connection, then a notification of a common network is transmitted and the host 82 and the client 84 may communicate and/or exchange data 154 on the common network, which may be include any suitable network that may be provided by the communication interfaces 54-66, in step 190.

If, however, no overlap of the profiles 148 exists in step 188, then the host 82 may determine if the client 84 has sent a hosting request in step 192. If no hosting request is received by the host 82, then the procedure 138 ends in step 194. If, however, a hosting request is received, the host 82 may select and transmit shared connection information to the client in step 196. The client 84 may select a hosting connection from the shared connection information transmitted from the host 82 in step 196 and may further transmit the selected hosting connection to the host 82 in step 198. If, in step 200, the selected hosting connection is approved by the host 82, a connection may be established using the selected hosting connection of the host 82 via tunneling in step 202. This hosting connection may be transmitted across an IEEE 802.11, a Bluetooth®, or other similar interface that commonly exists in both the host 82 and the device 84. In this manner, the client 84 may communicate through the hosted connection to an external network or directly to the host 82. If, however, the selected hosting connection is not approved by the host 82 in step 200, the procedure 138 for communication between the host 82 and the client 84 ends in step 194.

Figure 7A:
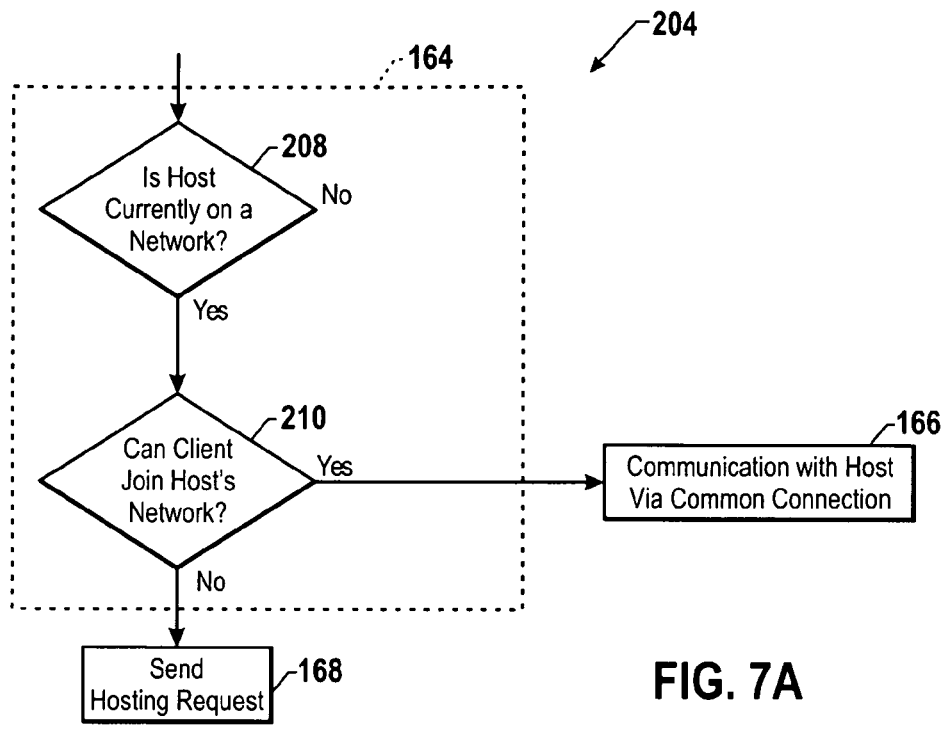
FIG. 7A is a flow chart corresponding to a decision block of the flow chart of FIG. 6A.
Figure 7B:
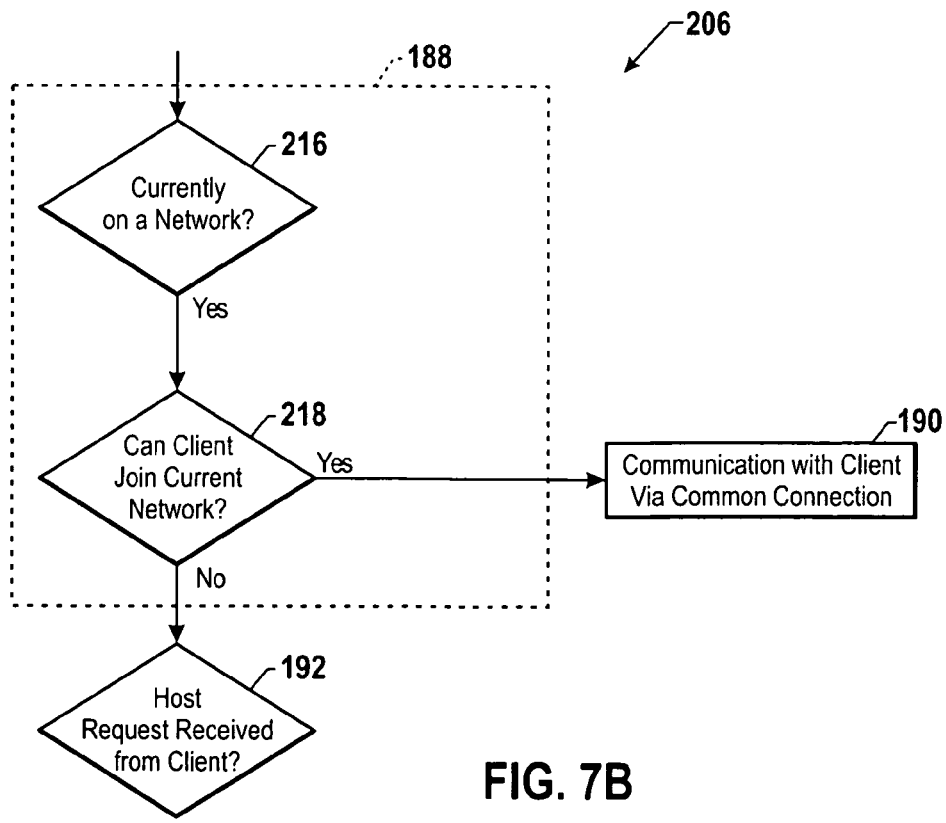
FIG. 7B is a flow chart corresponding to a decision block of the flow chart of FIG. 6B.

FIGS. 7A and 7B illustrate flow charts 204 and 206 respectively, corresponding to steps 164 and 188 of FIGS. 6A and 6B. The flow chart 204 of FIG. 7A illustrates the steps taken in the determination of step 164 as to the overlap of the profiles 148, that is, if a common network 86 is available for connection. In step 208, the client 84 determines if the host 82 is currently on a network. If the host 82 is on a network, the client 84, in step 210, attempts to join the network of the host 82. If the client 84 is able and/or allowed to join the network of the host 82, the client 84 proceeds to step 166. If, however, the client 84 is not able and/or allowed to join the network of the host 82, the client 84 proceeds to step 168.

Similarly, the flow chart 206 of FIG. 7B illustrates the steps taken in the determination of step 188 as to the overlap of the profiles 148, that is, if a common network 86 is available for connection. In step 216, the host 82 determines if it is currently on a network. If the host 82 is on a network, in step 218, the host 82 determines if the client 84 is able and/or allowed to join the network of the host 82. If the client 82 is able and/or allowed to join the network of the host 82, the host 82 proceeds to step 190. If, however, the client 84 is not able and/or allowed to join the network of the host 82, the host 82 proceeds to step 168.

Figure 8:
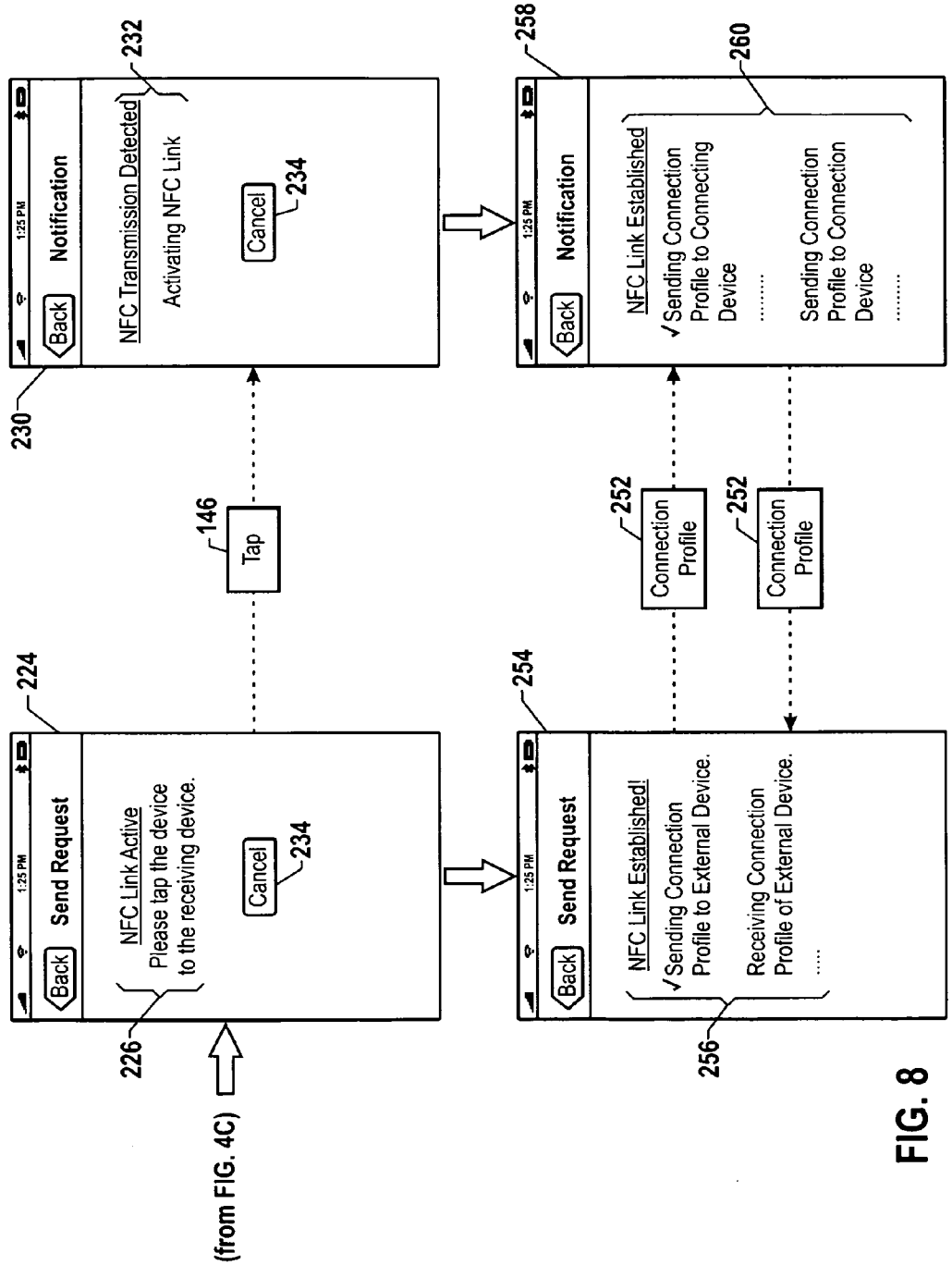
FIG. 8 illustrates a series of screen shots corresponding to network connection procedure of FIG. 5.

As described above, FIG. 4C illustrates a screen showing a connect to external device page 128 that displayed an initiate network connection using the NFC tab 130, described more fully above with respect to FIGS. 6A and 6B. Selection of the initiate network connection using NFC tab 130 of FIG. 4C may lead to the screens shown in FIG. 8. For example, screen 224 may correspond to a screen that will be displayed on the display 24 of the client 84 upon selection of the initiate network connection using NFC tab 130. The screen 224 may include a notification message 226 indicating that the NFC device 46 of the client 84 is presently active and capable of establishing an NFC connection 144 with an external device, such as the host 82. Accordingly, the notification message 226 may further instruct a user of the client 84 to tap (e.g., 146) a second device, such as the host 82, in order to establish the NFC connection 144.

Figure 9:
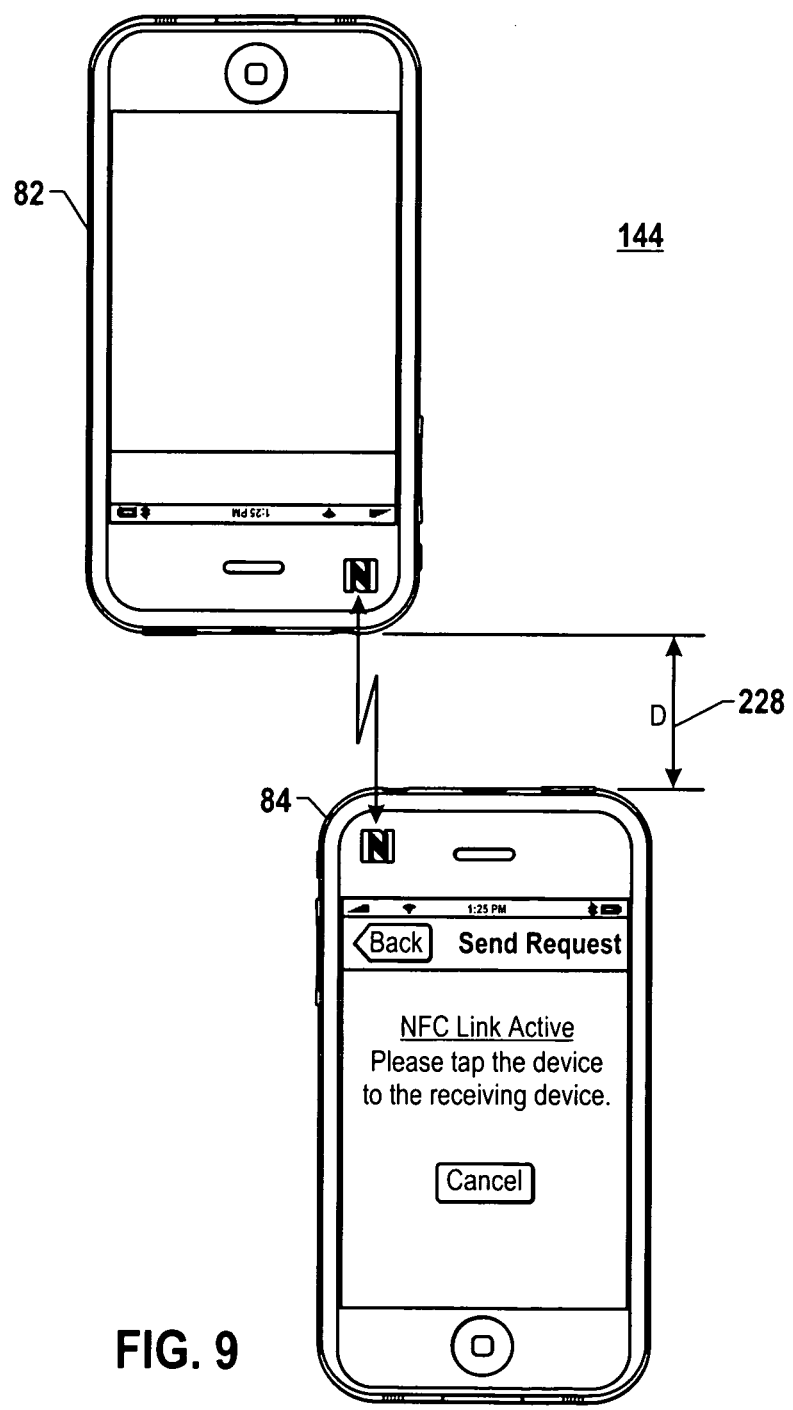
FIG. 9 illustrates the formation of an NFC connection between the electronic device of FIG. 1 and the second device of FIG. 5.

Referring briefly to FIG. 9, the initiation of an NFC connection 144 between two devices, namely the host 82 and the client 84, by way of the tap operation 146 is illustrated. As the client 84 is placed within an acceptable distance 228 (e.g., 2-4 cm) from the host 82, the host 82 may be placed into an active mode in which the NFC device 46 within the host 82 is powered on, thus enabling the corresponding NFC device 46 of the host 82 and providing the establishment of the NFC connection 144 between the client 84 and the host 82. Although the host 82 illustrated in FIG. 9 is depicted as being a portable device similar to the client 84, it should be understood that in alternate embodiments, the host 82 may also include non-portable devices, such as a personal computer, a computing workstation, or alternative portable devices.

Returning to FIG. 8, once the client 84 is tapped 144 to the host 82, the host 82 may detect the NFC transmissions (e.g., ping messages) being emitted from the client 84, as seen in screen 230. The screen 230 may include a notification message 232 informing the host 82 that an NFC transmission has been detected and that in response, the corresponding NFC device 46 of the host 82 is being powered on and the corresponding NFC device 46 enabled. The notification screen 230 may further provide a graphical button 234 by which the host 82 may cancel the NFC connection process if selected. This graphical button may also be present on the screen 224 of the client 84.

Figure 10:
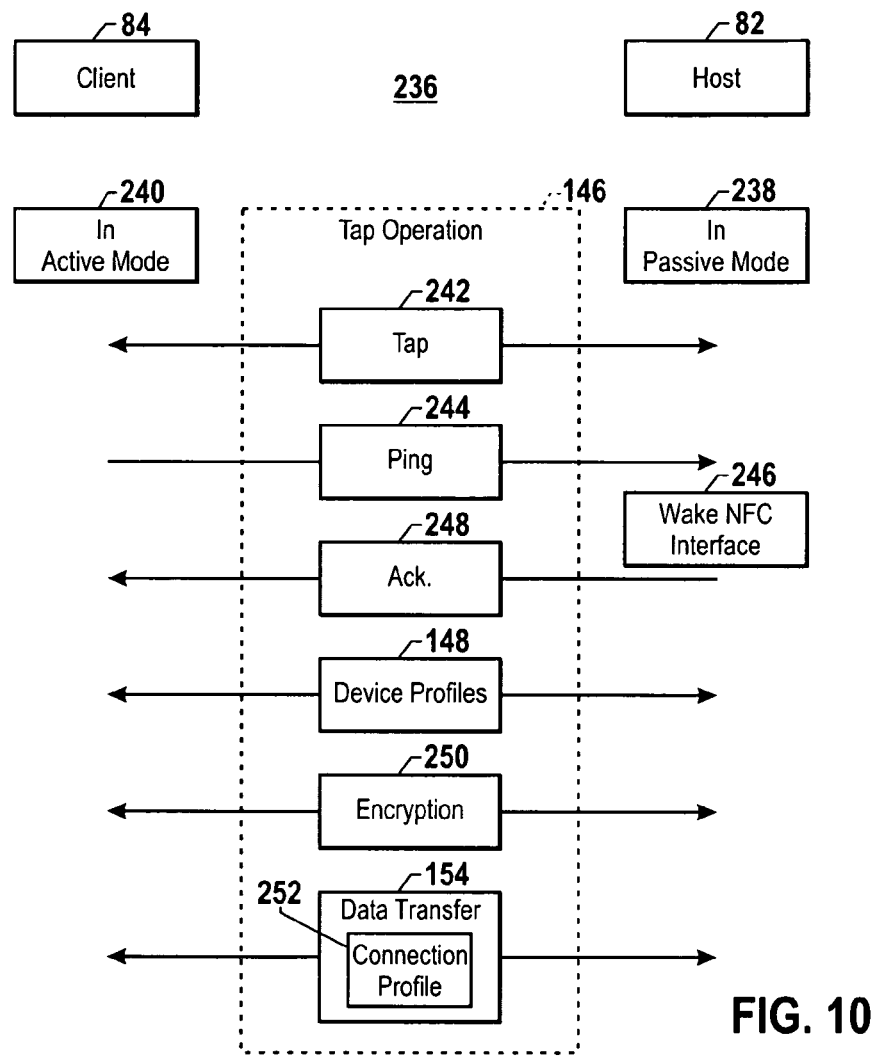
FIG. 10 illustrates a tap procedure shown in FIG. 5.

Referring briefly to FIG. 10, a schematic diagram 236 of the NFC tap operation 146 is illustrated. For instance, prior to the initiation of the NFC connection 144, the host 82 may be in a passive mode, as denoted by reference numeral 238. While in the passive mode 238, an NFC device 46 that may be included in the host 82 may remain inactive until the NFC device 46 detects an NFC transmission from an external device, such as the client 84. While in the active mode 240, the NFC device 46 of the client 84 may periodically emit NFC communication signals to seek out other NFC-enabled devices having their own respective NFC devices 46 and within the appropriate range to facilitate an NFC connection.

For instance, when the client 84 and the host 82 are placed within an appropriate range (e.g., the tap operation 146) for establishing an NFC connection, from about 2 cm to about 4 cm, the establishment of the connection may begin with an initial tap 242. It should be understood that in tapping the devices, it is important that the NFC devices 46 within each respective device are positioned in such a way that the distance between the respective NFC devices 46 is suitable for establishing an NFC-based connection. For example, if the host 82 is a relatively large non-portable device, a user would be required to position the client 84 such that the NFC device 46 within the client 84 is within the appropriate distance of any corresponding NFC circuitry within the host 82 in order to establish the NFC connection 144.

While the NFC device 46 of the client 84 operates in the active mode 240, the client 84 may periodically emit ping messages 244. The corresponding NFC device 46 of the host 82 may receive the ping messages 244, thus causing the NFC device 46 located within the host 82 to awaken 246 upon the detection of the NFC transmission, thereby transitioning from a passive mode 238 to an active mode 240. Once powered on and active, the NFC device 46 of the host 82 may reply in response to the ping message 244 by sending an acknowledgement message 248, which may be received via the NFC device 46 of the client 84.

Following the sending of the acknowledgement message 248, the client 84 and the host 82 may exchange device profiles 148. The device profiles 148 may include a variety of information regarding the functions available on the client 84 and the host 82. For example, the device profiles 148 may be represented by data messages of any suitable form, including extensible markup language (XML), which may denote the device name, serial number, owner name, device type, as well as any other type of identifying information. Additional identifying information may include, for example, the name of a service provider, such as a network or cellular telephone service provider that may be associated with each of the host 82 and client 84. The device profiles 148 may additionally include information with regard to the capabilities of the client 84 or the host 82 by indicating which applications, drivers, or services may be installed on each device.

Additionally, the client 84 and the host 82 may also exchange information with regard to the encryption measures available on each device, as represented by reference numeral 250. As discussed above, because various transactions between the host 82 and the client 84 may involve the transfer of sensitive information, the use of one or more encryption measures 250 for protecting the transaction information being transferred between the client 84 and the host 82. Accordingly, once the NFC connection 146 is established and the device profiles 148 and encryption measures 250 are exchanged, data may be exchanged between the host 82 and client 84, as indicated by reference numeral 154. Furthermore, connection profiles 252 corresponding the status and/or availability of all potential network connections 106 available to the host 82 and the client 84 may be transmitted along with the data exchanged 154.

Returning to FIG. 8, if the establishment of the NFC connection 144 is permitted on the host 82, then the screen 254 displayed on the client 84 may be updated to display the notification message 256. The notification message 256 may indicate that an NFC connection 144 has been established and connection profiles 252 are being transmitted and received.

Meanwhile, the screen 258 displayed on the host 82 may be updated to display the notification message 260. The notification message 260 may indicate that an NFC connection 144 has been established and connection profiles 252 are being transmitted and received.

Figure 11:
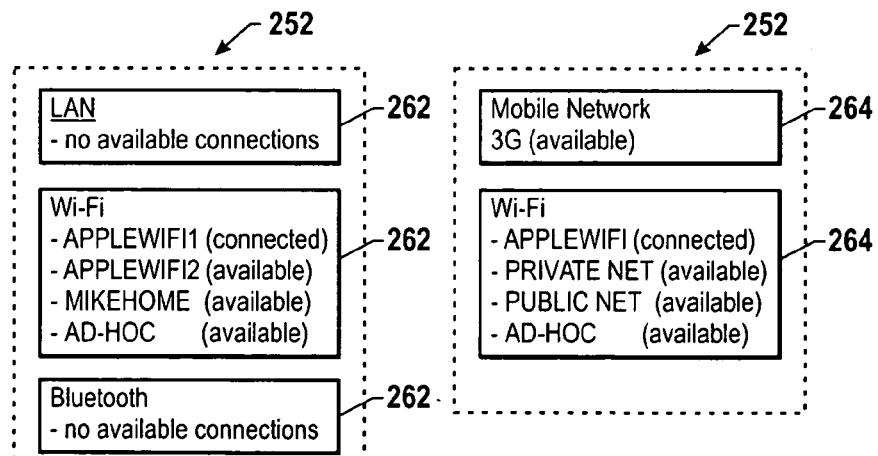
FIG. 11 illustrates the connection profiles transmitted between the electronic device of FIG. 1 and the second device of FIG. 5.

An example of the connection profiles 252 being transmitted between the host 82 and the client 84 are illustrated in FIG. 11. In the illustrated example, the client 84 connection profiles 262 and the host connection profiles 264 share only one common connection profile 252; APPLEWIFI2. Indeed, the host 82 is connected to APPLEWIFI2, while the client has APPLEWIFI2 as an available network. Accordingly, the host 82 and the client have a common network available.

Figure 12:
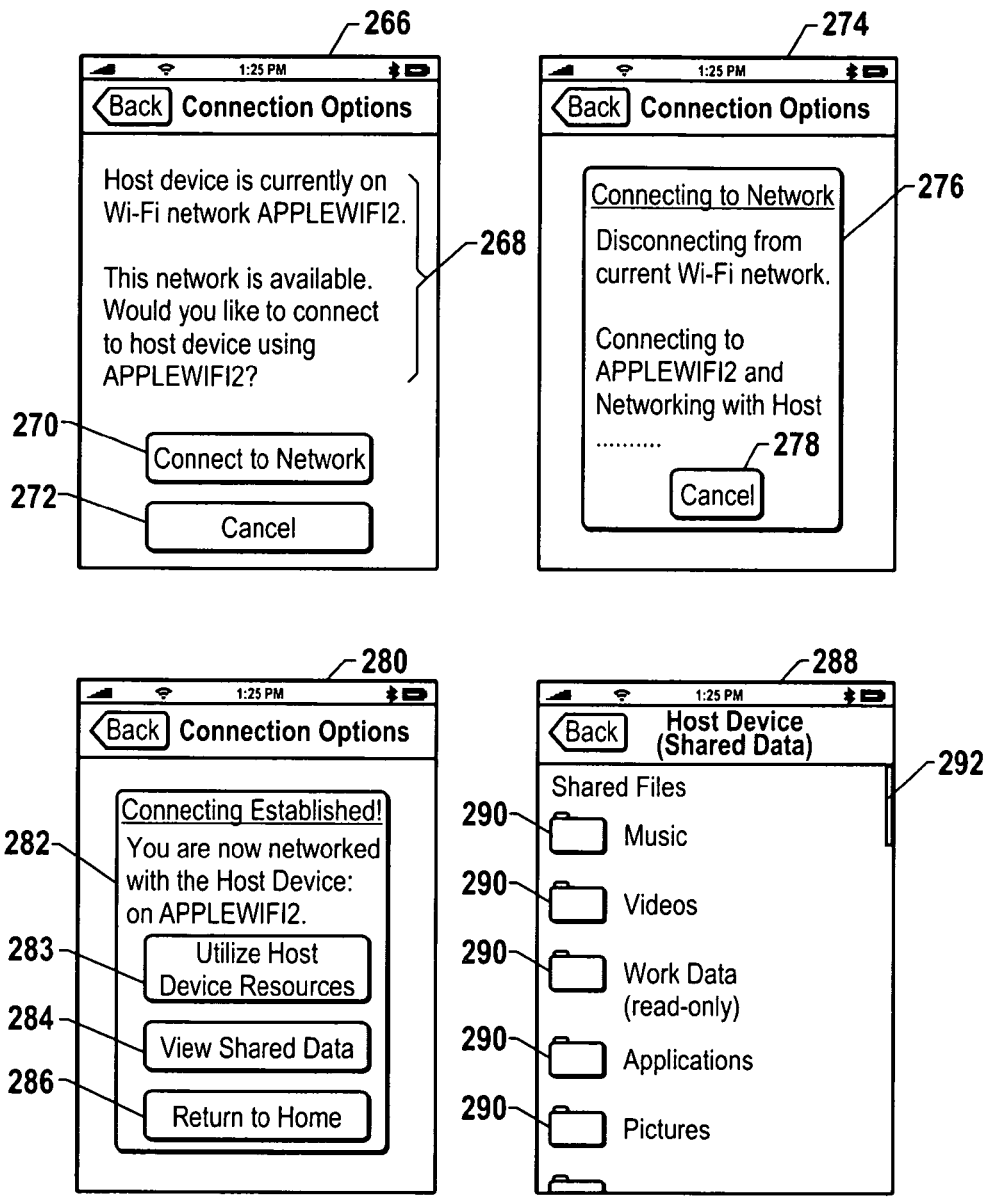
FIG. 12 illustrates a series of screen shots of the second device of FIG. 5 regarding a common network with the electronic device of FIG. 1.

Thus, per flow charts 156 and 180, the host 82 and the client 84 may communicate using the common network, here APPLEWIFI2. FIG. 12 illustrates screens for display on the display 24 of the client 84 regarding the common network 86. Screen 266 illustrates a connection option screen 266 for the client 84. The connection option screen 266 may include a notification message 268 identifying the connection for the host 82, as well as presenting a user the option to connect to the network via a connect tab 270, or cancel the connection via the cancel tab 272. Screen 274 illustrates a pop up window 276 that may be displayed on the display 24 of the client 84 after the connect tab 270 is selected.

If the user fails to click cancel tab 278 while the pop up window 276 is displayed on the display 24 of the client 84, screen 280 is generated on the display of the client 84, showing a message 282 that the connection has been established and presenting a user with a utilize host device resources tab 283, a view shared data tab 284, and a return to home tab 286. Selection of the utilize host device resources tab 283 may allow the client 84 to use certain resources of the host device 82, such as access a private wi-fi network or utilize the telephone network of the host device. Selection of the return home tab 286 may return the user to the home screen 29, while selection of the view shared data tab 284 may generate screen 288 on the display 24 of the client 84. Screen 288 may display a list of all folders and/or files 290 shared by the host 82 and accessible by the client 84 via the display and the scroll bar 292. Conversely, the host 82 may see a list of all folders and/or files 290 shared by the client 84 and accessible by the host 82. In this manner, the host 82 and the client 84 may efficiently share data files 290 via a common network 86. However, while screens 266, 274, 280, and 288 may illustrate sharing of data files across a common network when both the host 82 and the client 84 have access to an external network, a second embodiment may whereby the client 82 does not have access to an external network is described below.

Figure 13:
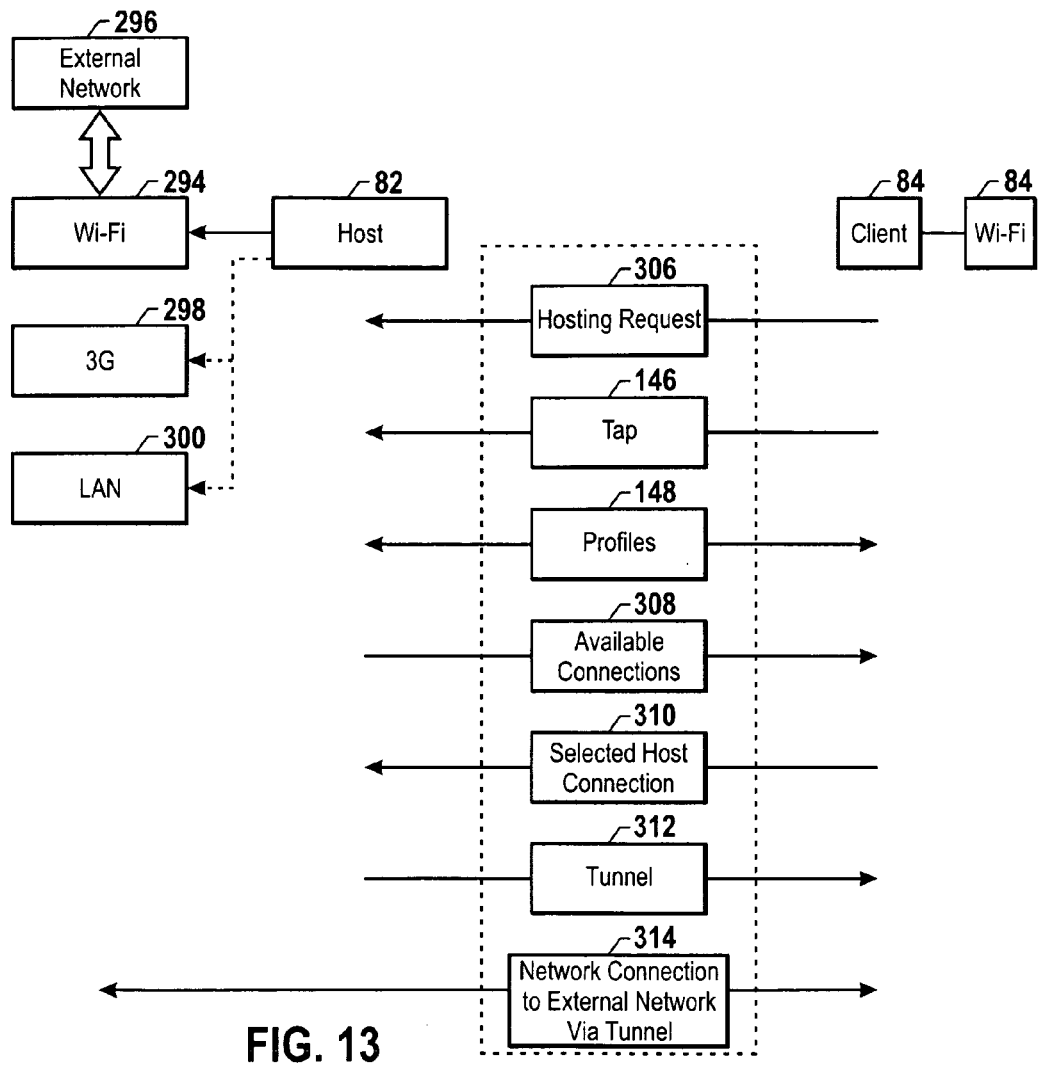
FIG. 13 is illustrates a tunneling procedure between the electronic device of FIG. 1 and a client device via a near field communication (NFC) connection.
Figure 14:
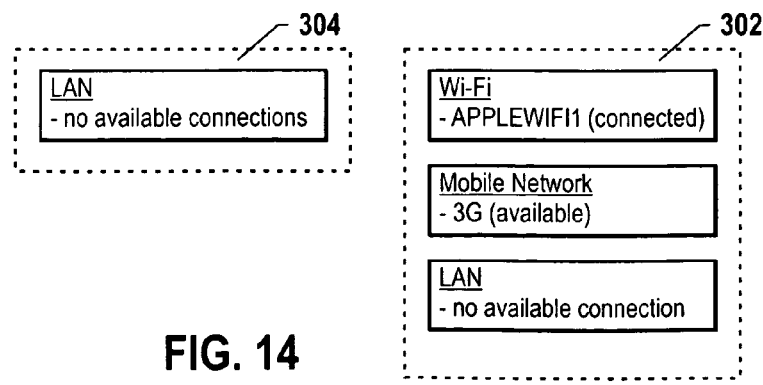
FIG. 14 illustrates the connection profiles transmitted between the electronic device of FIG. 1 and the client device of FIG. 13.

FIG. 13 illustrates a second embodiment involving the host 82 and the client 84. The host 82 may be connected to, for example, a wi-fi connection 294 that permits access to an external network 296. The external network 296 may be used, for example, to connect to the Internet. Additionally, the host 82 may be able to connect to the external network 296 via a 3G connection 298 or a LAN connection 300. Conversely, the client 84 may have a wi-fi connection 294 that is unable to access an external network 296. This may be shown in FIG. 14. While there is a wi-fi, a mobile network, and a LAN connection available in the connection profile 302 of the host 82, the wi-fi connection in the connection profile 304 of the client 84 shows no connections. This may occur, for example when the client 84 is in an area that only includes private wi-fi data networks, and the client 84 does not have access to the private wi-fi data networks. Alternatively, this may occur when the client 84 that typically uses a direct subscriber line (DSL) or a cable internet connection to access an external network loses its connection to the DSL or cable internet connection. Accordingly, the client 84 can not access the external network 296 on its own. Instead, the host 82 may provide the client 84 a connection to the external network 296 via tunneling. Tunneling may include a first device, such as the host 82, creating a network connection for the second device, such as the client 84, from a network connection of the first device, thus allowing the client 84 to access the external network 296.

This process for providing a tunnel to the client is illustrated in FIG. 13. Specifically, the client 84 may initiate a hosting request 306. The hosting request 306 may operate to activate the NFC device 46 in the client 84. Additionally, a tap operation 146 may occur in a manner similar to that described with respect to FIG. 11 above. Furthermore, the profiles 148 of the host 82 and of the client 84 may be exchanged, which may include a list of networks the host 82 and client 84 may be able to connect to, respectively.

Additionally the host 82 may select one or more connections to be transmitted as available connections 308 to the client 84. The client 84 may, based on the available connections 308, select one of the host connections 310. The host 82 may form a tunnel 312 using the selected host connection 310 to create a network connection 314 useable by the client 84 to connect to the external network 296. During use of the tunnel 312 by the client 84, it should be noted that the host 82 may act as a conduit or pass thru device that routes data between the client 84 and the external network 296.

Figure 15:
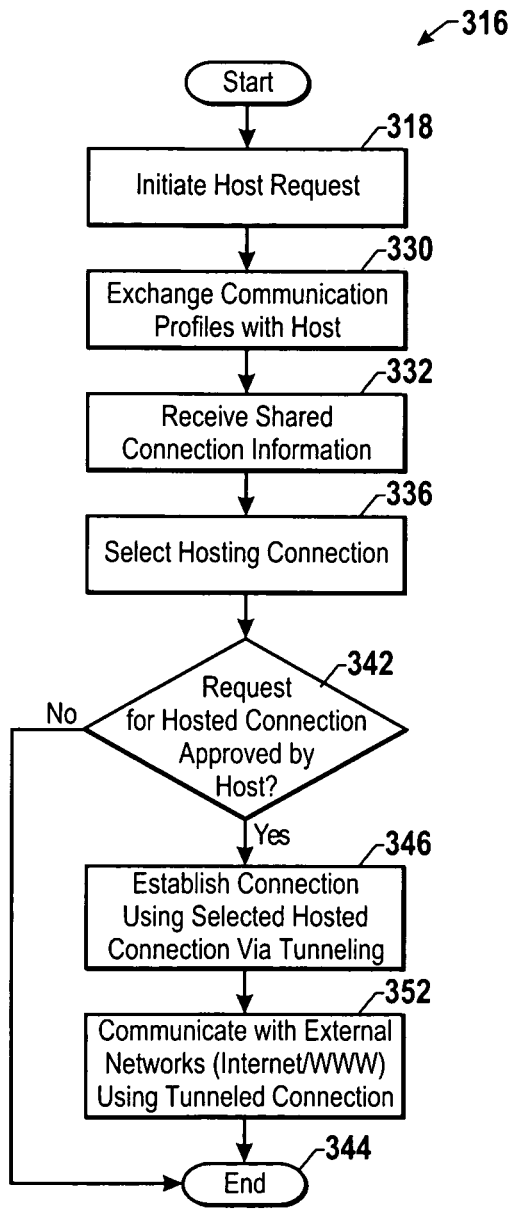
FIG. 15 is a flow chart corresponding to the procedure of FIG. 13 from the perspective of the client device of FIG. 13.

A flowchart 316 is illustrated in FIG. 15 showing the steps outlined above with respect to FIG. 13 from the perspective of the client 84. In step 318, the client 84 may initiate a hosting request 306 that may operate to activate an NFC device 46 in the client 84. Additionally, step 318 may include executing a tap operation 146 between the client 84 and the host 82. In step 320, the client 84 may exchange profiles 148 with the host 82. However, since the client 84 in this example fails to any available connection, the client 84 may, in step 320, merely receive the profiles 148 of the host 82. In step 322, the client 84 may receive one or more connections as available connections 308, as selected by the host 82. The client 84 may, based on the available connections 308 received, select a host connection 310 in step 324.

If the selection performed in step 324 is not approved by the host 82 in step 326, the tunneling halts in step 328. If, however, the selection performed in step 324 is approved by the host 82 in step 326, a tunnel 312 is established in step 330. This tunnel 312 may allow for communication by the client 84 with an external network 296 in step 332.

Figure 16A:
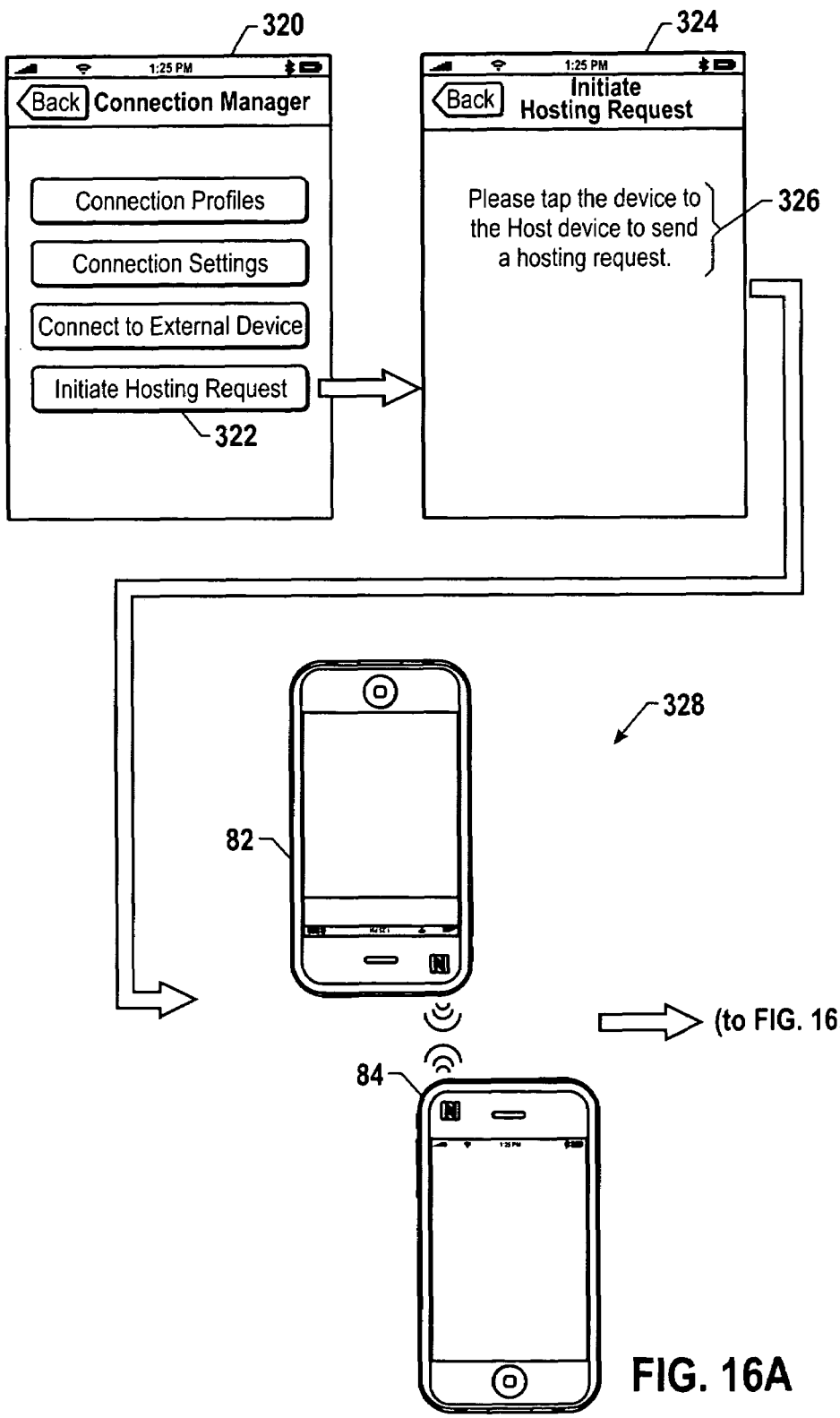
FIGS. 16A-D illustrate a series of screen shots corresponding to the flow chart of FIG. 15.

A flowchart 316 is illustrated in FIG. 15 showing the steps outlined above with respect to FIG. 13 from the perspective of the client 84. In step 318, the client 84 may initiate a hosting request 306 that may operate to activate an NFC device 46 in the client 84. This may be accomplished by selecting the initiate hosting request tab 322 on the screen 320 of FIG. 16A. Additionally, step 318 may include executing a tap operation 146 between the client 84 and the host 82. Step 318 may thus cause the display 24 of the client 84 to display a tap request 326 on screen 324 of FIG. 16A. This tap request may be completed by aligning the host 82 and the client 84 as shown in diagram 328 of FIG. 16A.

Figure 16B:
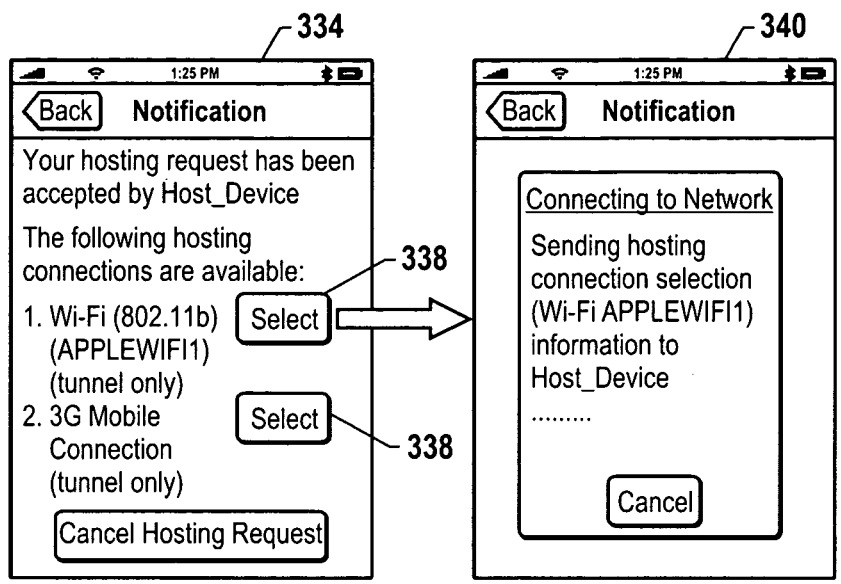

In step 330, the client 84 may exchange profiles 148 with the host 82. However, since the client 84 in this example fails to any available connection, the client may, in step 330, merely receive the profiles 148 of the host 82. In step 332, the client 84 may receive one or more connections as available connections 308, as selected by the host 82. This may be shown in screen 334 of FIG. 16B. A user may, based on the available connections 308 received, select a host connection 310 in step 336. This may be accomplished by selecting a select tab 338 in screen 334 that corresponds to the desired host connection 310. Accordingly, screen 340 will be displayed on the display 24 of the client 84 upon selection of a host connection 310.

Figure 16C:
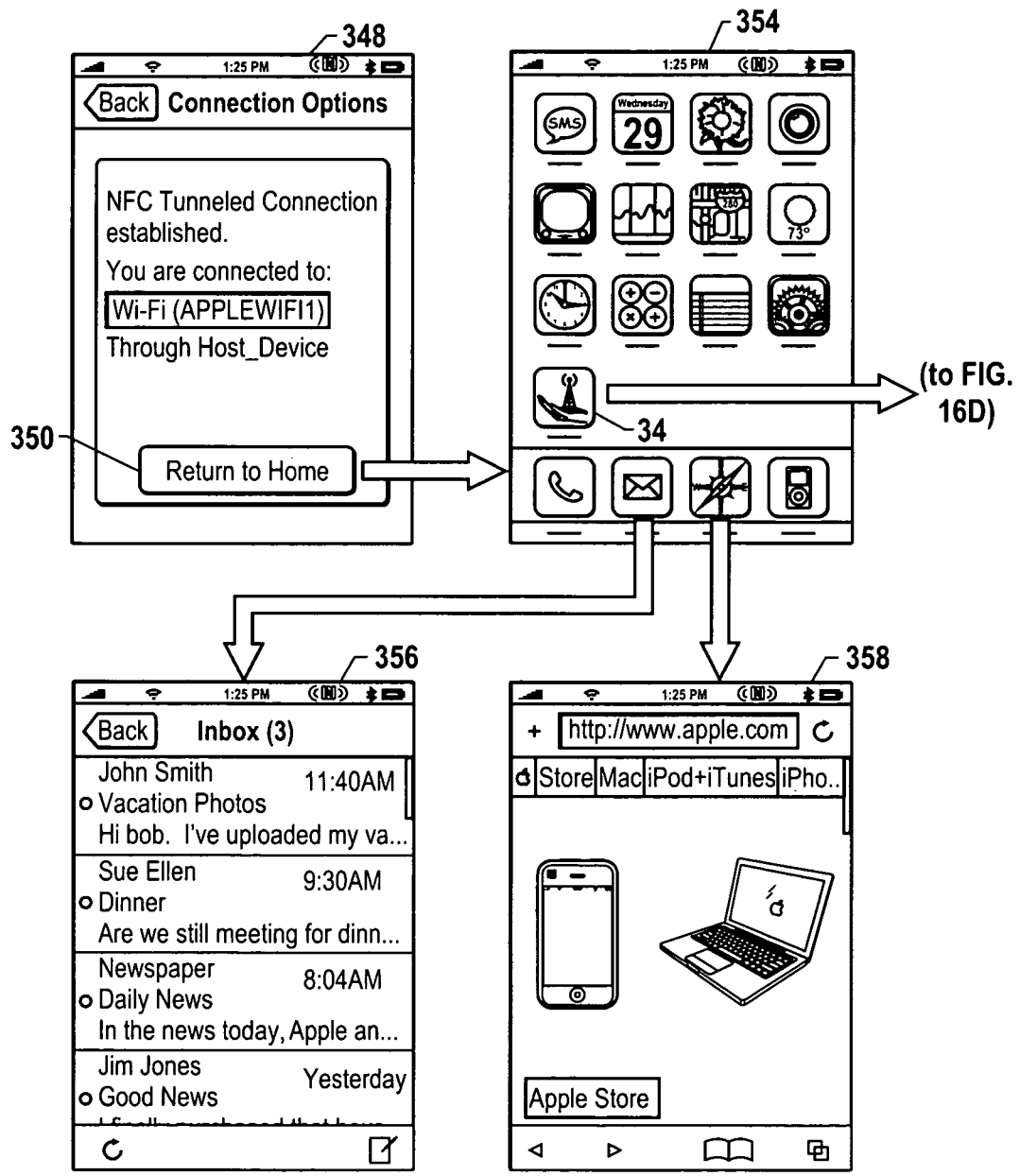

If the selection performed in step 336 is not approved by the host 82 in step 342, the tunneling halts in step 344. If, however, the selection performed in step 336 is approved by the host 82 in step 342, an NFC tunnel 312 may be established in step 346. Screen 348 of FIG. 16C displays this result, including a return to home tab 350. The NFC tunnel 312 may allow for communication by the client 84 with an external network 296 in step 352, as shown in screen 354 of FIG. 16C. Screen 354 presents an identical view to that displayed on the home screen of the host 82. Additionally, the client 84 may access the external network 296 in an identical manner to the host 82. For example, selection of an email icon 30 on the display 24 of the client 82 allows for accessing of corresponding email account on the external network 296. This result is illustrated by screen 356 of FIG. 16C. In another example, selection of an Internet icon 30 on the display 24 of the client 82 allows for accessing of the internet on the client 84. This result is illustrated by screen 358 of FIG. 16C.

Figure 16D:
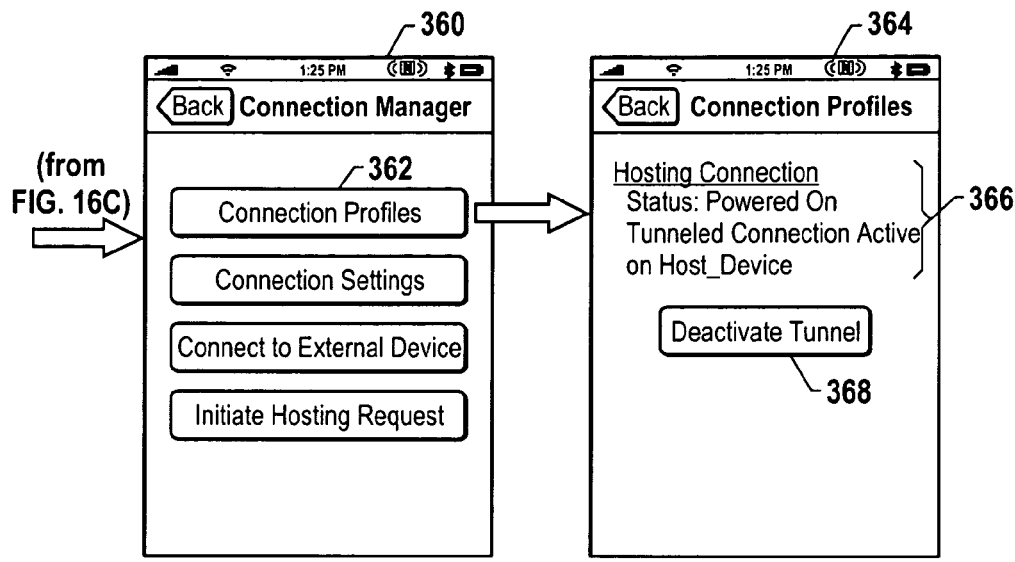

Furthermore, the client 84 is no longer without a connection profile 148. Screen 360 of FIG. 16D illustrates a connection manager for the client 84. Upon selection of the connection profiles tab 362, screen 364 may be displayed. Screen 364 may show a tunneling connection profile 366. Furthermore, the tunneling connection profile 366 may also include a deactivation tab 368 for disabling the tunnel 312, thus terminating the access to the external network by the client 84.

Figure 17:
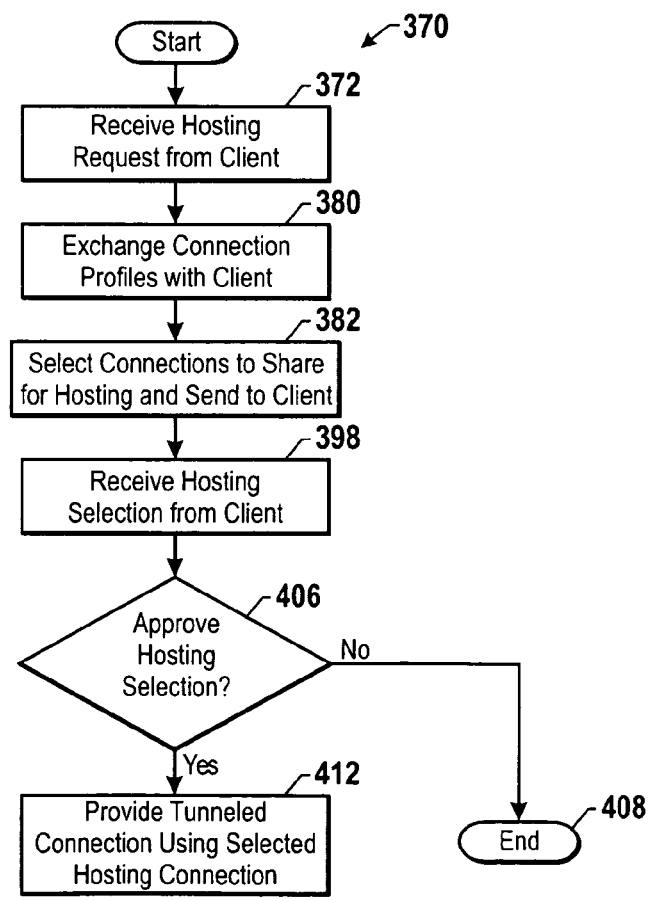
FIG. 17 is a flow chart corresponding to the procedure of FIG. 13 from the perspective of the electronic device of FIG. 1.
Figure 18A:
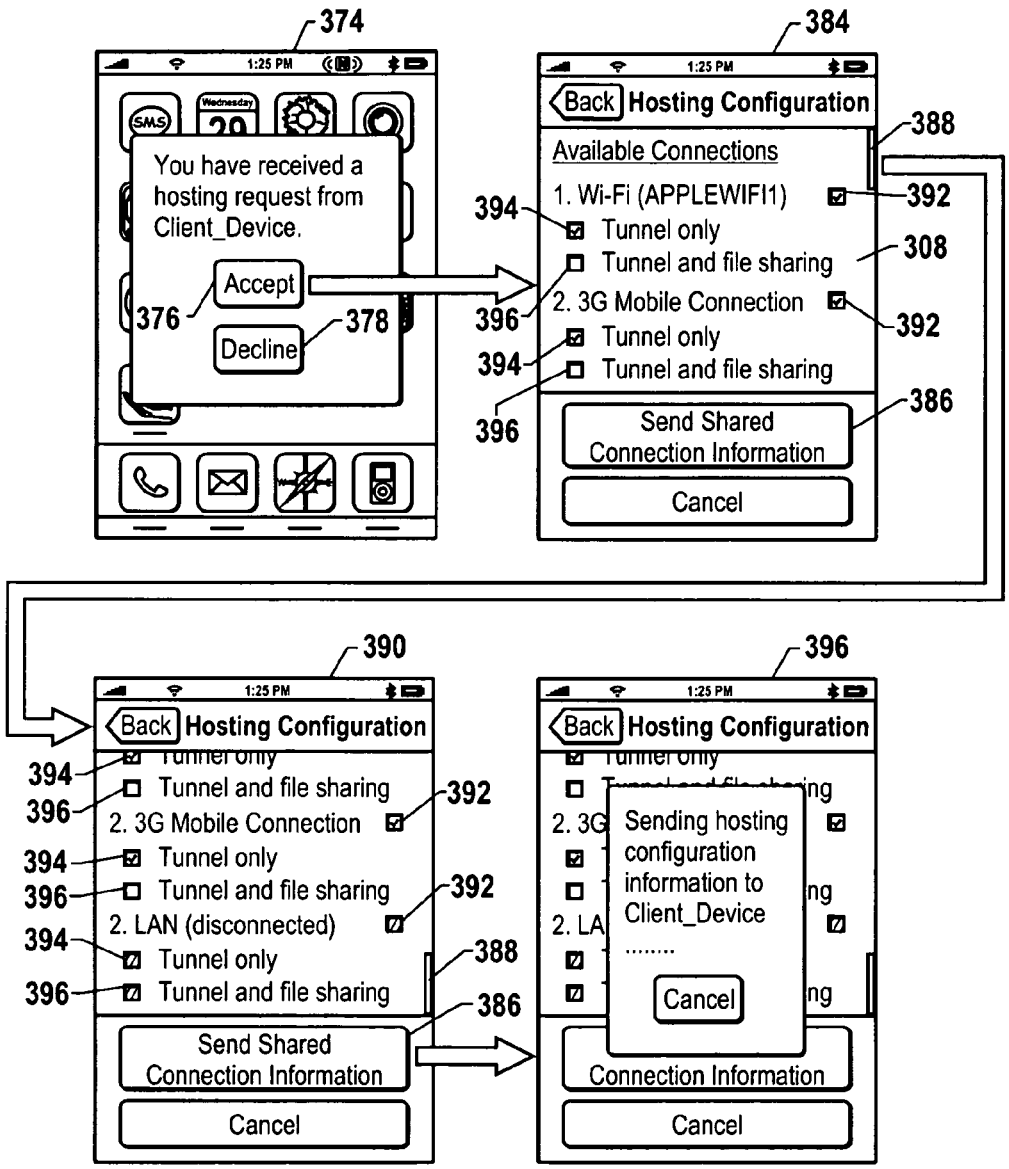
FIGS. 18A-B illustrate a series of screen shots corresponding to the flow chart of FIG. 17.

A flowchart 370 is illustrated in FIG. 17 showing the steps outlined above with respect to FIG. 13 from the perspective of the host 82. In step 372, the host 82 may receive a hosting request 306 from the client 84. This may be illustrated by screen 374 of FIG. 18A. Furthermore, screen 374 shows that a user may either accept a connection profile exchange 148 with the client via the accept tab 376, or the user may deny the profile exchange 148 via a decline tab 378. If the user chooses to accept the hosting request 306, the host 82 may exchange profiles 148 with the client 84 in step 380. Accordingly, in step 382, a user of the host 82 may select connections to share for hosting and send the choices to the client 84. The display 24 of the host 82 may display screen 384 corresponding to the selections for available connections 308. In addition to the selections for available connections 308, a send shared connection tab 386 and a scroll bar 388 may be displayed on the display 24. The send shared connection tab 386 may transmit shared connection information to the client 84. Additionally, there may be more selections for available connections 308 than can be seen on the display at any given time. Accordingly, the scroll bar 388 may be utilized to scroll through the plurality of selections for available connections 308, as can be seen in screen 390, which shows a second grouping of selections for available connections 308 on the display 24 of the host 82.

Selection of one or more selections for available connections 308 may be accomplished through selection of a share box 392 adjacent to each of the selections for available connections 308 selectable by the user. Additionally a user may select tunneling only or tunneling and file sharing via a tunneling box 394 and a tunneling and file sharing box 396 adjacent to each of the selections for available connections 308. In this manner, a user may allow a client 84 access to either, or both, a network connection 308 of the host 84, or files stored on the host 84.

Figure 18B:
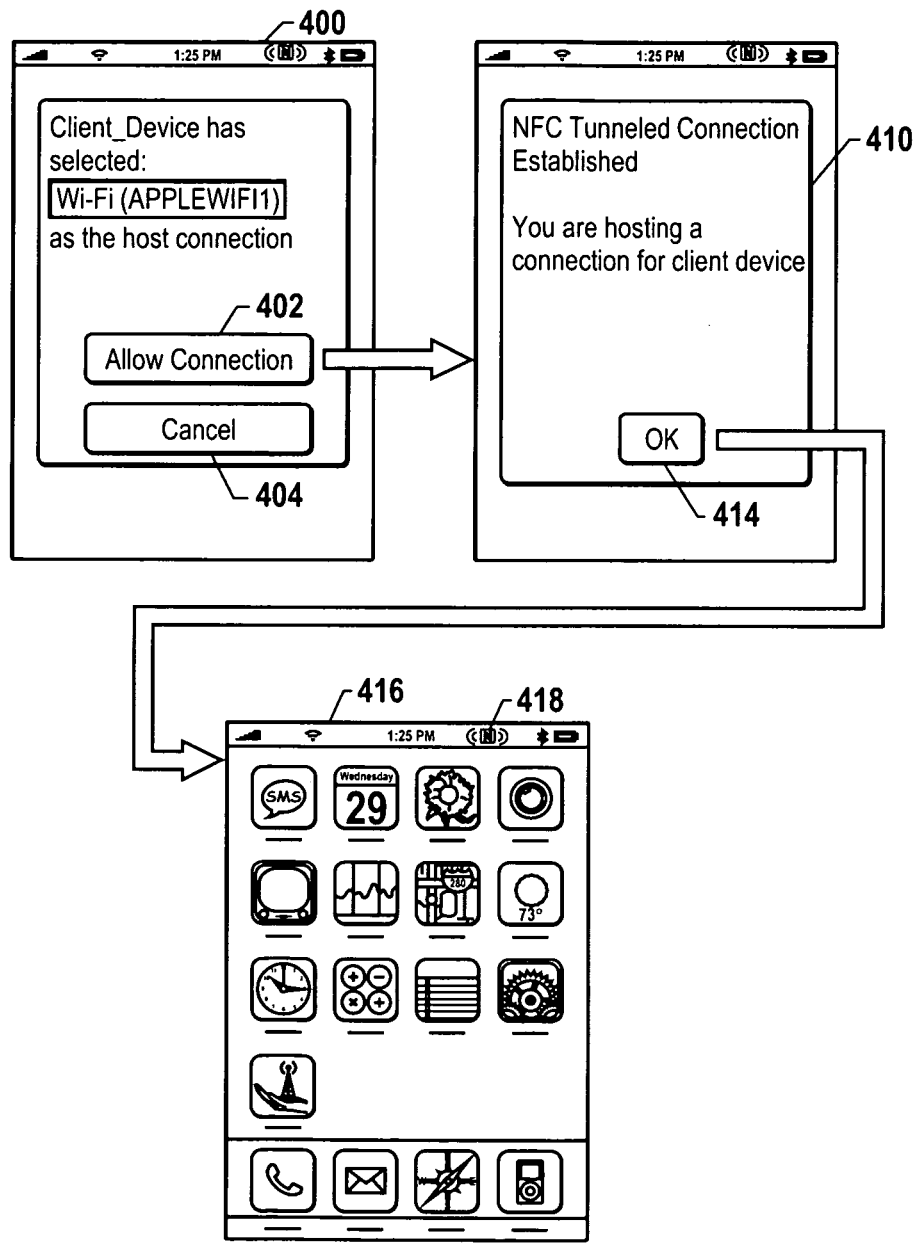

Upon selection one or more selections for available connections 308, screen 396 may be shown on the display 24. This screen 396 may correspond to sending the selections for available connections 308 to the client 84. As a client 84 makes selections of the available connections 308, these selections are received in step 398. This may be represented by screen 400 of FIG. 18B. Screen 400 may show selections for available connections 308 made by the client 84. Moreover, the screen 400 may show an allow tab 402 and a cancel tab 404. The allow tab 402 and the cancel tab 404 may correspond to step 406, whereby the host 82 may either allow or reject the connection selection of the client 84. If the cancel tab 404 is selected, the tunneling process ends in step 408. However, if the allow tab 402 is selected, then screen 410, corresponding to step 412 of providing a tunneled connection using the selected hosting connection, may be displayed.

Screen 410 corresponds to a connection provided to the client 84 via a tunnel 312. As noted on screen 410, the host 82 and client 84 may utilize the tunnel 312 to continue the connection. Screen 410 may include an ok tab 414. Selection of this tab 414 may return the host 82 to screen 416, which may appear similar to home screen 29 with an additional connection icon 418. The connection icon 418 may indicate that a tunnel 312 via host 82 is being used for a network connection 314 to an external network 296, and further that this network connection 314 is being provided to the client 84.

Specific embodiments have been shown by way of example in the drawings and have been described in detail herein. However, it should be understood that the claims are not intended to be limited to the particular forms disclosed. Rather, the claims are to cover all modifications, equivalents, and alternatives falling within their spirit and scope.

What is claimed is:

1. An electronic device, comprising:
a communication interface adapted to provide a plurality of network connections for connecting the electronic device to a plurality of networks;
a storage device to store a connection profile identifying at least a portion of the network connections sharable with other devices;
a near field communication (NFC) interface adapted to communicate with another device over an NFC field; and
a connection manager configured to
receive a host connection request from a secondary device via the NFC interface,
in response to the host connection request, display in a display of the electronic device a list of the plurality of network connections, each of the network connections is associated with a selection button to allow a user of the electronic device to select which of the network connections to be shared with the secondary device, wherein each of the network connections further includes:
　　a first selectable option to specify that the associated network connection is only for tunneling to allow the secondary device to access an external network through the electronic device, and
　　a second selectable option to specify that the associated network connection is for both tunneling and file sharing to allow the secondary device to access an external network through the electronic device and to access files stored in the electronic device,
generate a connection profile based on user selections of the network connections and their options,
transmit the connection profile containing identifying information identifying the sharable network connections of the connection profile to the secondary device via the NFC interface,
receive a selection from the secondary device via the NFC interface selecting one of the sharable network connections, and
establish the selected network connection with the secondary device via the NFC interface to allow the secondary device to access a corresponding network via the communication interface based on user selections specified in the connection profile.

2. The electronic device of claim 1, wherein the NFC device is adapted to utilize the one of the one or more network connections for file sharing between the electronic device and the secondary device.

3. The electronic device of claim 1, wherein the one of the one or more network connections is a wi-fi connection.

4. The electronic device of claim 3, wherein the one of the one or more network connections is an Enhanced Data rates for GSM Evolution (EDGE) network connection.

5. The electronic device of claim 3, wherein the one of the one or more network connections is a 3G network connection.

6. A method for wireless communication, comprising:
detecting that a first device has been placed adjacent to a second device;
initiating an NFC communication path between the first and the second devices comprising:
　　displaying in a display of the first device a list of the plurality of network connections, each of the network connections is associated with a selection button to allow a user of the electronic device to select which of the network connections to be shared with the second device, wherein each of the network connections further includes:
　　　　a first selectable option to specify that the associated network connection is only for tunneling to allow the second device to access an external network through the first device, and
　　　　a second selectable option to specify that the associated network connection is for both tunneling and file sharing to allow the second device to access an external network through the first device and to access files stored in the first device;
generate a connection profile based on user selections of the network connections and their options;
transmitting the connection profile to the second device to allow a user of the second device to select one of the network connections;
receiving at the first device a network connection from the second device via the NFC communication path, the requested network connection is one of a plurality of sharable network connections offered by the first device;
granting the second device access to an allowed network connection selected from the sharable network connections of the first device via a host connection shared by both the first and second devices via the NFC communication path; and
communicating between the second device and an external network across the allowed network connection via the host connection over the first device based on configuration specified and selected by the user of the second device in the connection profile, wherein the communicating is initiated by the secondary device.

7. The method of claim 6, wherein the host connection is a wi-fi connection.

8. The method of claim 6, comprising providing access to data files of the first device to the second device via the host connection.

9. The method of claim 6, wherein initiating an NFC communication path comprises transmitting connection profiles from the first device to the second devices, wherein the connection profiles include information relating to the available network connections of the first device and host connections of the first and second devices.

10. The method of claim 9, wherein requesting a network connection from the first device by the second device comprises choosing one or more of the connection profiles and transmitting the one or more chosen connection profiles from the second device to the first device.

11. The method of claim 10, wherein granting the second device access to an allowed network connection of the first device comprises receiving the one or more chosen connection profiles from the second device and opening the one or more chosen connection profiles to access by the second device as the allowed network connection.

12. The method of claim 6, wherein communicating between the second device and an external network across the allowed network connection comprises the second device accessing the external network while the host connection remains available.

13. A non-transitory machine-readable medium storing instructions, which when executed by a processor, cause the processor to perform a method for wireless communication, the method comprising:
detecting that a first device has been placed adjacent to a second device;
initiating an NFC communication path between the first and the second devices comprising:
　　displaying in a display of the first device a list of the plurality of network connections, each of the network connections is associated with a selection button to allow a user of the electronic device to select which of the network connections to be shared with the second device, wherein each of the network connections further includes:
　　　　a first selectable option to specify that the associated network connection is only for tunneling to allow the second device to access an external network through the first device, and
　　　　a second selectable option to specify that the associated network connection is for both tunneling and file sharing to allow the second device to access an external network through the first device and to access files stored in the first device;
generate a connection profile based on user selections of the network connections and their options;

transmitting the connection profile to the second device to allow a user of the second device to select one of the network connections;

receiving at the first device a network connection from the second device via the NFC communication path, the requested network connection is one of a plurality of sharable network connections offered by the first device;

granting the second device access to an allowed network connection selected from the sharable network connections of the first device via a host connection shared by both the first and second devices via the NFC communication path; and communicating between the second device and an external network across the allowed network connection via the host connection over the first device based on configuration specified and selected by the user of the second device in the connection profile, wherein the communicating is initiated by the secondary device.

14. The medium of claim 13, wherein the host connection is a wi-fi connection.

15. The medium of claim 13, comprising providing access to data files of the first device to the second device via the host connection.

16. The medium of claim 13, wherein initiating an NFC communication path comprises transmitting connection profiles from the first device to the second devices, wherein the connection profiles include information relating to the available network connections of the first device and host connections of the first and second devices.

17. The medium of claim 16, wherein requesting a network connection from the first device by the second device comprises choosing one or more of the connection profiles and transmitting the one or more chosen connection profiles from the second device to the first device.

18. The medium of claim 17, wherein granting the second device access to an allowed network connection of the first device comprises receiving the one or more chosen connection profiles from the second device and opening the one or more chosen connection profiles to access by the second device as the allowed network connection.

19. The medium of claim 13, wherein communicating between the second device and an external network across the allowed network connection comprises the second device accessing the external network while the host connection remains available.

* * * * *